United States Patent
Winiecki

(10) Patent No.: US 11,030,833 B2
(45) Date of Patent: *Jun. 8, 2021

(54) SYSTEM AND METHOD OF MONITORING A FUNCTIONAL STATUS OF A VEHICLE'S ELECTRICAL POWERING SYSTEM

(71) Applicant: Kenneth Carl Steffen Winiecki, Cupertino, CA (US)

(72) Inventor: Kenneth Carl Steffen Winiecki, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/416,607

(22) Filed: May 20, 2019

(65) Prior Publication Data

US 2019/0272685 A1    Sep. 5, 2019

Related U.S. Application Data

(63) Continuation-in-part of application No. 15/636,628, filed on Jun. 28, 2017, now Pat. No. 10,330,568, which is a continuation-in-part of application No. 15/236,245, filed on Aug. 12, 2016, now Pat. No. 10,121,292, and a continuation-in-part of application No. PCT/IB2016/052611, filed on May 6, 2016, and a continuation-in-part of application No.

(Continued)

(51) Int. Cl.
| | |
|---|---|
| *G07C 5/08* | (2006.01) |
| *G01M 15/04* | (2006.01) |
| *G01C 22/02* | (2006.01) |
| *F02D 41/00* | (2006.01) |
| *G07C 5/12* | (2006.01) |

(52) U.S. Cl.
CPC .......... *G07C 5/085* (2013.01); *F02D 41/0097* (2013.01); *G01C 22/02* (2013.01); *G01M 15/04* (2013.01); *G07C 5/12* (2013.01); *G07C 5/0808* (2013.01)

(58) Field of Classification Search
CPC ........ G07C 5/085; G07C 5/12; G07C 5/0808; F02D 41/0097; G01C 22/02; G01M 15/04
USPC .......................................................... 702/57
See application file for complete search history.

(56) References Cited

U.S. PATENT DOCUMENTS

| | | | |
|---|---|---|---|
| 3,691,668 A | * | 9/1972 | Strebig ............... A01K 91/065 43/19.2 |
| 9,008,947 B1 | | 4/2015 | Winiecki |

(Continued)

*Primary Examiner* — Toan M Le
*Assistant Examiner* — Xiuqin Sun

(57) ABSTRACT

A system and a method of monitoring a functional status of a vehicle's electrical powering system (VEPS) makes measurements on the vehicle's electrical powering system, diagnoses problems for the VEPS, and sends a warning notification to the vehicle's owner. A retrofit device is electrically coupled to the VEPS, or a computerized battery is included in the VEPS. The retrofit device or the computerized battery periodically makes voltage readings. The retrofit device or the computerized battery stores and analyzes those voltage readings so that the retrofit device or the computerized battery predicts any malfunctions or failure that may occur for the VEPS. If the retrofit device or the computerized battery does predict a malfunction or failure in the VEPS, then the retrofit device or the computerized battery would output a warning notification either through the retrofit device or the computerized battery themselves or another external computing device.

16 Claims, 19 Drawing Sheets

Related U.S. Application Data

PCT/US2015/038644, filed on Jun. 30, 2015, said application No. PCT/IB2016/052611 is a continuation of application No. 14/507,221, filed on Oct. 6, 2014, now Pat. No. 9,008,947.

(60) Provisional application No. 62/399,874, filed on Sep. 26, 2016, provisional application No. 62/355,534, filed on Jun. 28, 2016, provisional application No. 62/204,208, filed on Aug. 12, 2015, provisional application No. 61/951,381, filed on Mar. 11, 2014.

(56) References Cited

U.S. PATENT DOCUMENTS

| | | |
|---|---|---|
| 10,121,292 B2 | 11/2018 | Winiecki |
| 10,330,568 B2 * | 6/2019 | Winiecki ............ G01M 13/028 |
| 2011/0257913 A1 * | 10/2011 | Philbrook ............ G01R 31/385 |
| | | 702/63 |
| 2012/0067113 A1 * | 3/2012 | Jaffe .................... G01M 15/02 |
| | | 73/114.62 |
| 2012/0123806 A1 * | 5/2012 | Schumann, Jr. ....... G06Q 40/08 |
| | | 705/4 |
| 2014/0095018 A1 * | 4/2014 | Atluri .................... B60L 58/20 |
| | | 701/36 |
| 2016/0077159 A1 * | 3/2016 | Petrucelli ............... G01K 13/00 |
| | | 324/426 |

* cited by examiner

SYSTEM AND METHOD OF MONITORING A FUNCTIONAL STATUS OF A VEHICLE'S ELECTRICAL POWERING SYSTEM

The current application is a continuation-in-part (CIP) application of a U.S. non-provisional application Ser. No. 15/636,628 filed on Jun. 28, 2017. The U.S. non-provisional application 15/636,628 claims a priority to a U.S. non-provisional application Ser. No. 15/236,245 filed on Aug. 12, 2016. The U.S. non-provisional application Ser. No. 15/236,245 claims a priority to a U.S. provisional application Ser. No. 62/204,208 filed on Aug. 12, 2015 and a priority to a U.S. provisional application Ser. No. 62/355,534 filed on Jun. 28, 2016.

FIELD OF THE INVENTION

The present invention generally relates to a smart multimeter for a vehicle's electrical powering system. More specifically, the present invention monitors a vehicle's battery and alternator in order to alerts the vehicle's owner to any current or potential malfunctions.

BACKGROUND OF THE INVENTION

Typically, a vehicle's owner needs open the hood of the vehicle's engine in order to check the voltage of the vehicle's battery with a multimeter, which can be cumbersome and time consuming. This manual method of checking the voltage of the vehicle's battery does not allow the vehicle's owner to easily keep a track record of the voltage measurements. In addition, this manual method does not allow the vehicle's owner to make voltage measurements while the vehicle's owner is driving the vehicle. Furthermore, this manual method also does not allow the vehicle's owner to accurately predict when the vehicle's battery or the vehicle's alternator is going to malfunction or fail.

Therefore, an objective of the present invention is to provide an easily-attachable device that can be electrically coupled to the vehicle's electrical powering system, which includes the vehicle's battery and the vehicle's alternator. Another objective of the present invention is for the easily-attachable device to continuously connected to the vehicle's electrical powering system, which allows the present invention to make continuous systematic measurements in order to analyze and determine the functional status of the vehicle's electrical powering system.

DETAILED DESCRIPTION OF THE INVENTION

All illustrations of the drawings are for the purpose of describing selected versions of the present invention and are not intended to limit the scope of the present invention.

The present invention is a system and a method of monitoring a functional status of a vehicle's electrical powering system, which includes the vehicle's battery, the vehicle's alternator, etc. The present invention is used to detect any abnormalities in the functional status of the vehicle's electrical powering system according to standards set by a manufacturer or according to operational data collected over time. Once the present invention detects an abnormality in the functional status of the vehicle's electrical powering system, the present invention notifies the vehicle's owner of the abnormality.

Figure 1A:
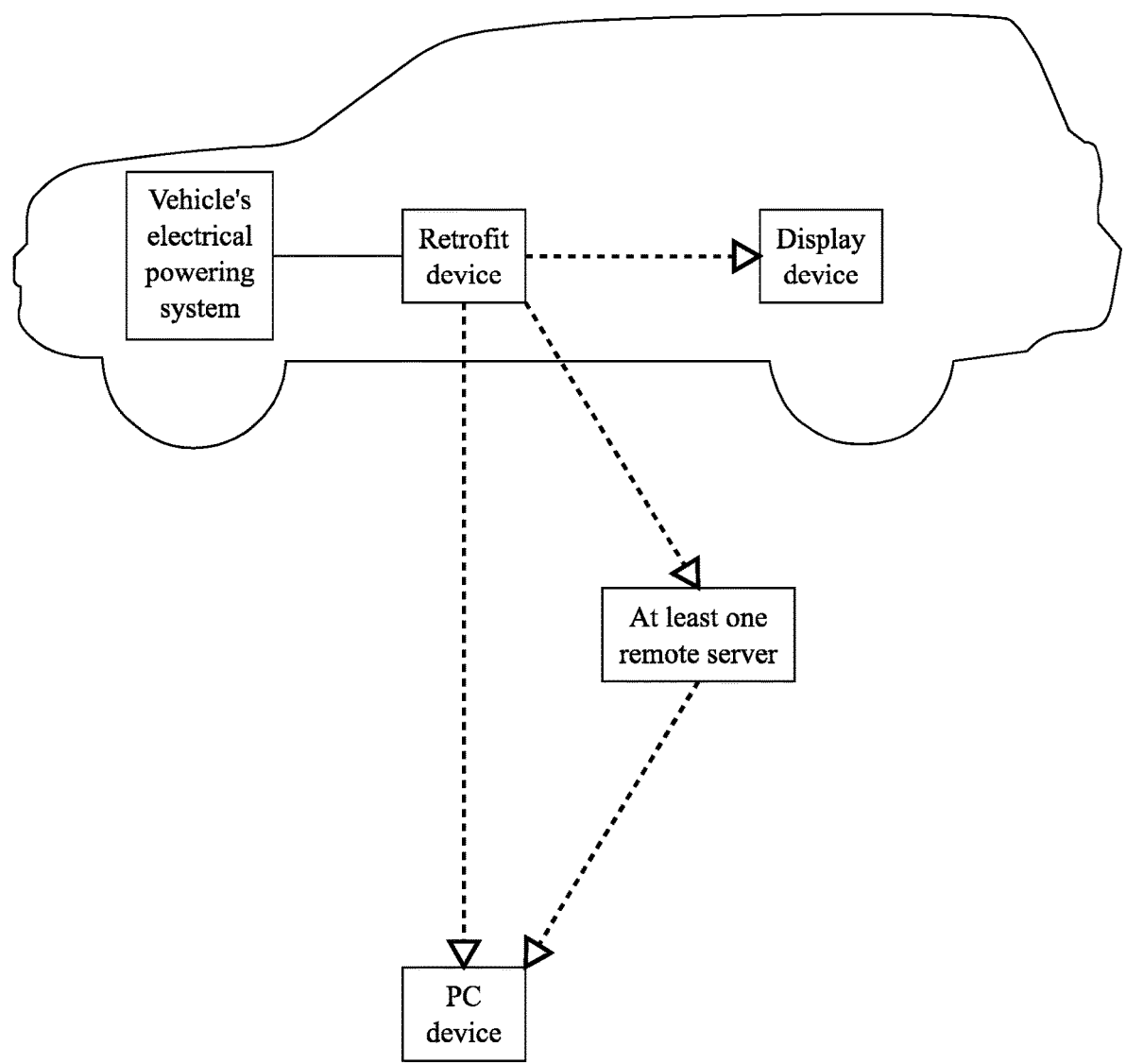
FIG. 1A is a block diagram of one embodiment for the system implemented by the present invention.
Figure 1B:
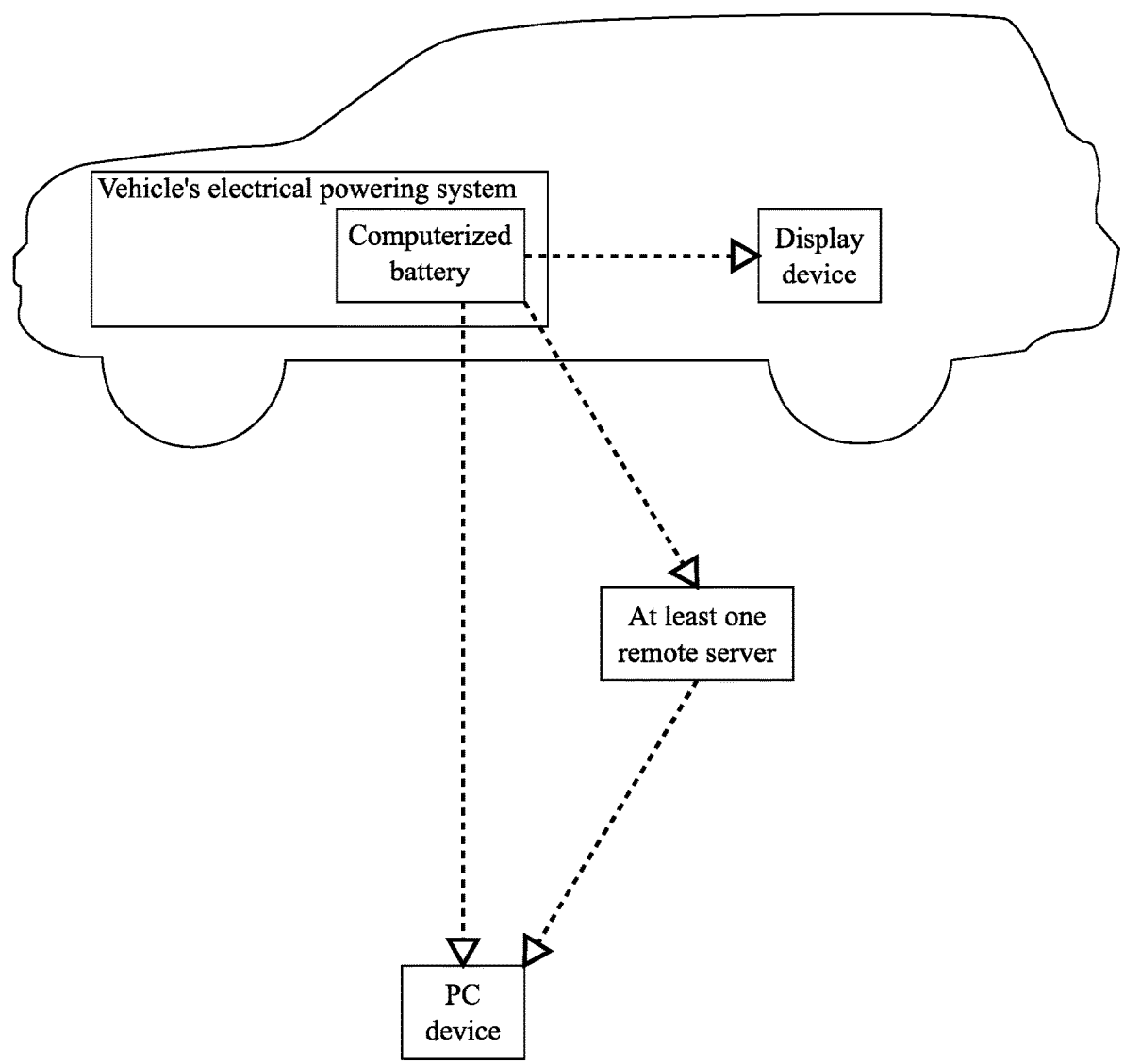
FIG. 1B is a block diagram of another embodiment for the system implemented by the present invention.

As can be seen in FIGS. 1A and 1B, the physical system that is used to implement the method of the present invention includes either a retrofit device or a computerized battery (Step A), which is used to monitor a plurality of measurable characteristics of the vehicle's electrical powering system (Step B). The measurable characteristics are quantifiable pieces of sensing data that can be monitored over time, such as the voltage across the vehicle's battery, the current through the vehicle's battery, or the resistance of the vehicle's battery. The retrofit device can be a device that is directly electrically spliced into the vehicle's electrical power system (e.g. electrically connected between the positive/negative terminal of a main battery within the vehicle's electrical powering system and the attachment end of a positive/negative wire of the vehicle's electrical powering system). The retrofit device can alternatively be, but is not limited to, a plug-in device that is engaged into the vehicle's cigarette lighter socket. In addition, the computerized battery is the main battery for the vehicle's electrical powering system and has a set of integrated electronic components that are able to detect, process, analyze sensor readings into meaningful pieces of data (i.e. a "smart" battery). The computerized battery may include a battery management system (BMS), which is able to make electrical measurements (e.g. current, voltage, and remaining charge) and to run diagnostics on the functionalities of the computerized battery.

Figure 2A:
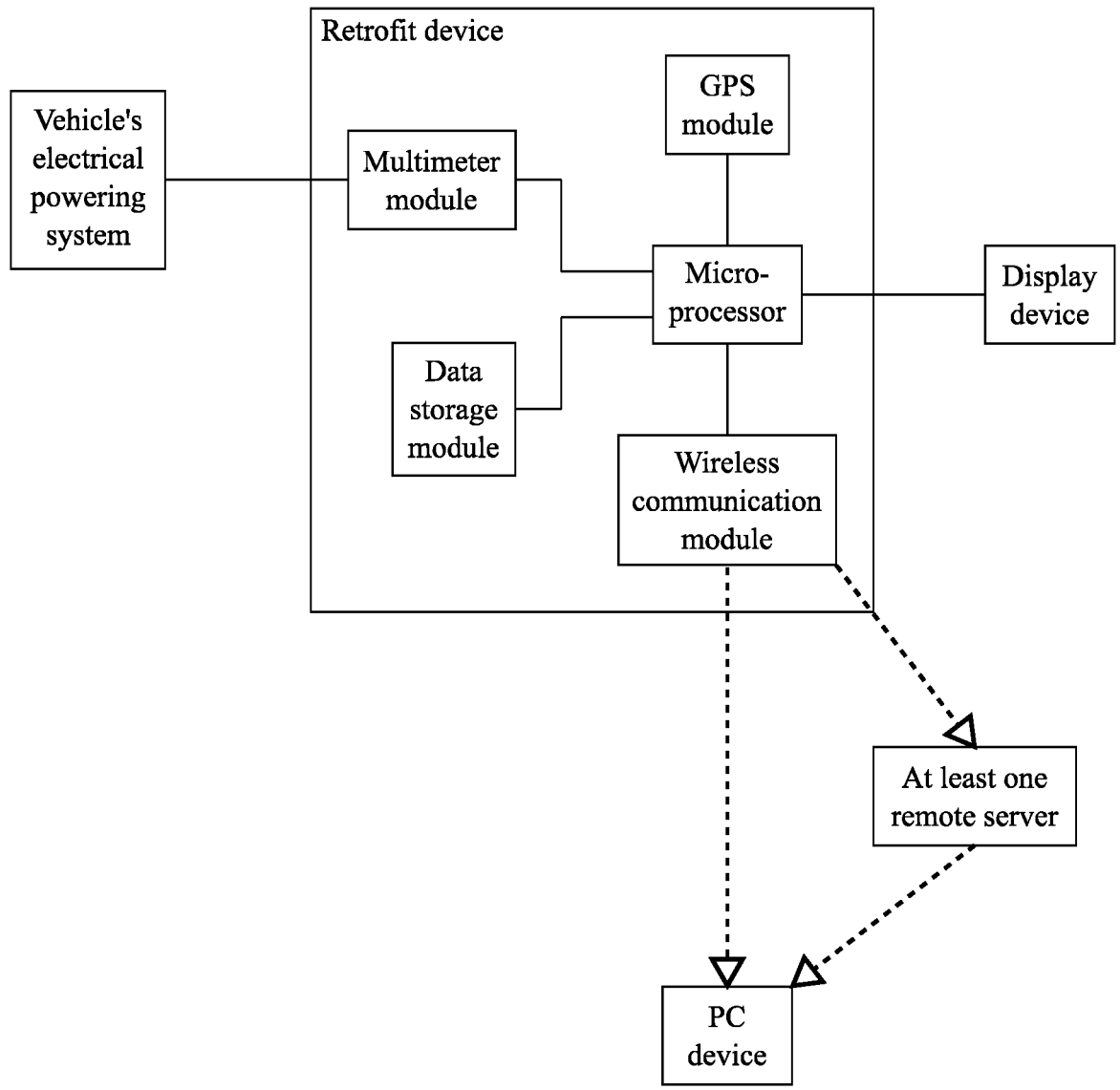
FIG. 2A is a block diagram of the components of the retrofit device.
Figure 2B:
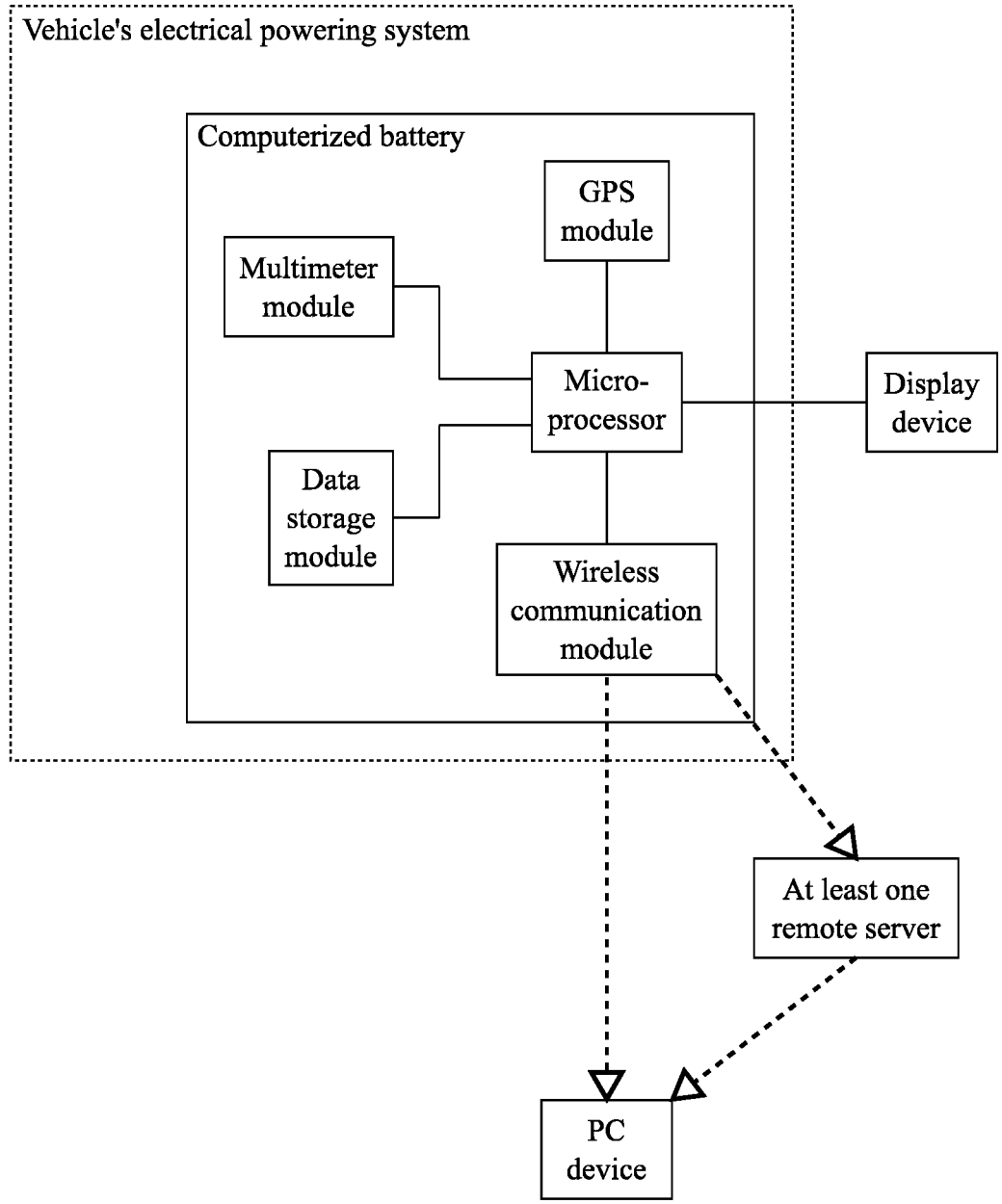
FIG. 2B is a block diagram of the components of the computerized battery.

In reference to FIGS. 2A and 2B, either the retrofit device or the computerized battery needs to include a multimeter module, a microprocessor, and a data storage module, which are used to gather, process, and store the plurality of measurable characteristics from the vehicle's electrical powering system. The data storage module is preferably a secure digital (SD) card that can be removed in order to physical transfer the stored sensing data to another computing device. In addition, the data storage module is used to store a manufacturer specification for each measurable characteristic as a point of reference. For example, the present invention monitors the real-time voltage data of the vehicle's main battery, but the ideal operational voltage of the vehicle's main battery is stored as the manufacturer specification on the data storage module so that the present invention can use the ideal operational voltage as a point of reference in its analysis of the real-time voltage data. The data storage module is also used to store a plurality of voltage triggers, each of which is associated to a corresponding response (Step C). Each voltage trigger is used to identify an abnormality in any measurement characteristic of the vehicle's electrical powering system, and the corresponding response is a predefined action that is executed by either the retrofit device or the computerized battery, such as sending a notification or an alert.

Figure 3A:
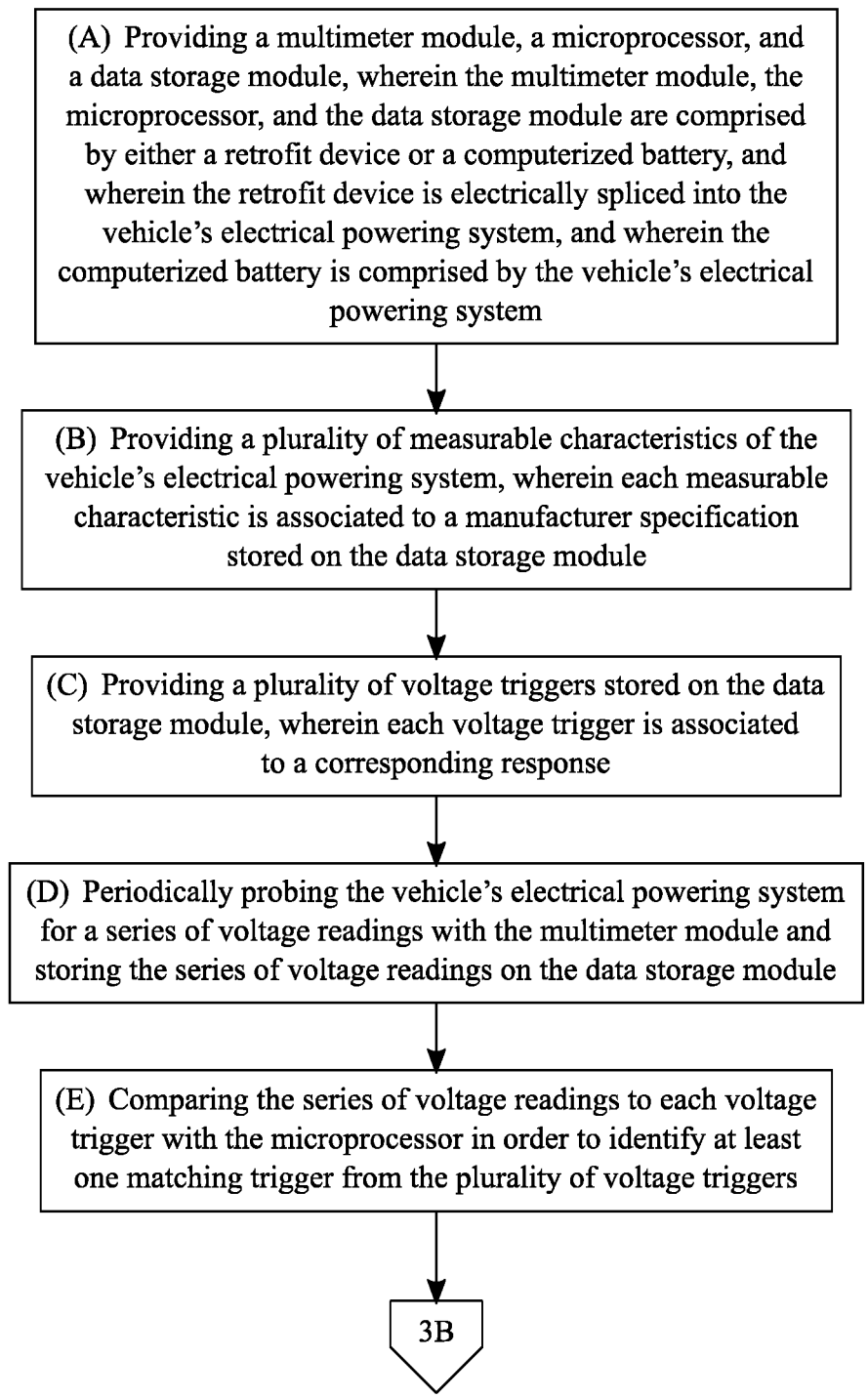
FIG. 3A is a flowchart of the overall process followed by the present invention.

In reference to FIG. 3A, the method of the present invention follows an overall process that allows either the retrofit device or the computerized battery to effectively and efficiently monitor the function status of the vehicle's electrical powering system. The overall process begins by periodically probing the vehicle's electrical powering system for a series of voltage readings with the multimeter module and by storing the series of voltage readings on the data storage module (Step D). The series of voltage readings is the real-time sensing data that is gathered to monitor the functional status of the vehicle's electrical powering system and is stored on the data storage module so that the real-time sensing data can be accessed at a later time for analysis. The overall process continues by comparing the series of voltage readings to each voltage trigger with the microprocessor in order to identify at least one matching trigger from the plurality of voltage triggers (Step E). The series of voltage readings need to meet the conditions of one of the plurality of voltage triggers in order for the microprocessor to identify a matching trigger. If the matching trigger is identified during Step E, then the microprocessor executes the corresponding response for the matching trigger (Step F). The corresponding response can be, but is not limited to, a warning notification/alert, a logged event, or a diagnostic process.

Figure 3B:
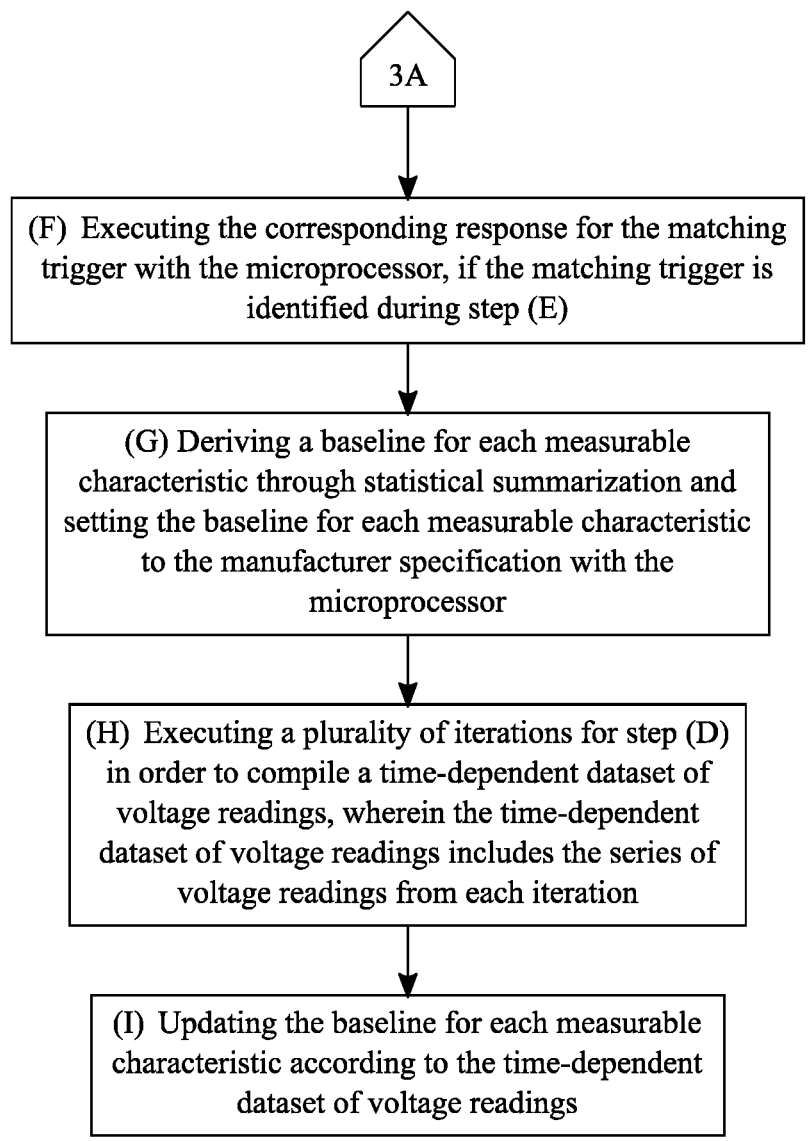
FIG. 3B is a continuation of the flowchart shown in FIG. 3A.

During the overall process, a supplementary process is concurrently implemented by either the retrofit device or the computerized battery in order to recognize and analyze trends from the logged sensing data over longer periods of time. As can be seen in FIG. 3B, the supplementary process begins by initializing the manufacturer specification as a baseline for each measurable characteristic with the microprocessor (Step G). The baseline is a statistical summarization of a measurable characteristic that is derived from the logged sensing data. Before the present invention is able to gather any logged sensing data, the present invention needs to set the baseline of each measurable characteristics to the manufacturer specification at the start of the supplementary process. When the overall process of the present invention is repeated multiple times, a plurality of iterations is executed for Step D, which allows the microprocessor to compile a time-dependent dataset of voltage readings. The time-dependent dataset of voltage readings includes the series of voltage readings from each iteration. The supplementary process concludes by updating the baseline for each measurable characteristic according to the time-dependent dataset of voltage readings (Step I), which allows the present invention to statistically summarize each measurable characteristic in real-time. A more detailed disclosure of how an adaptive baseline can be used to make failure predictions for the vehicle's electrical powering system or other parts of the vehicle can be found in the U.S. non-provisional application Ser. No. 15/236,245.

Figure 4:
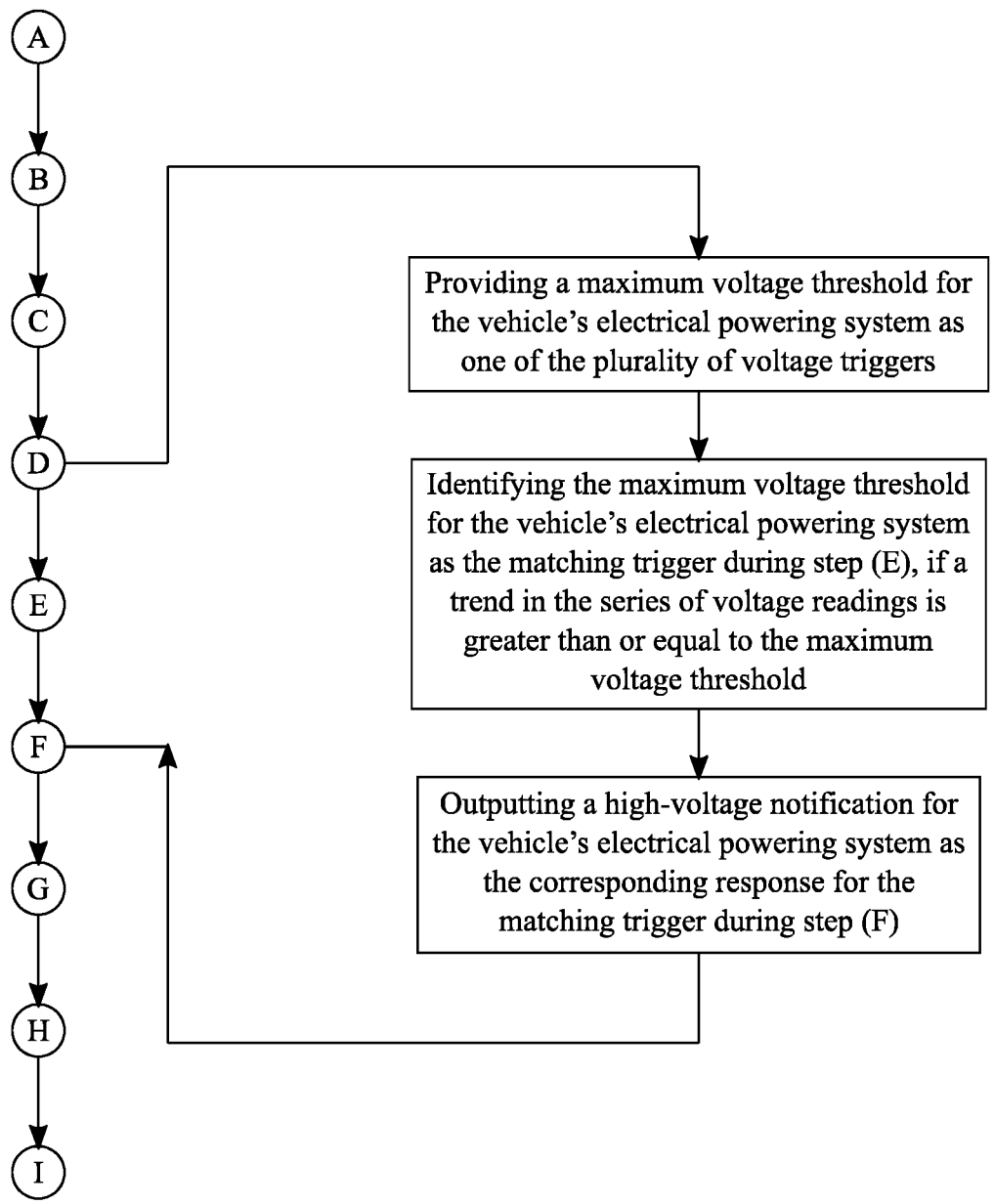
FIG. 4 is a flowchart illustrating the process of identifying and responding to a high-voltage situation for the vehicle's electrical powering system.

As can be seen in FIG. 4, a maximum voltage threshold for the vehicle's electric powering system can be provided as one of the plurality of voltage triggers. The maximum voltage threshold is a voltage value that is abnormally higher than the regular operational voltage value of the vehicle's electric powering system. For example, the regular operational voltage value of the vehicle's battery would be 14 volts (V), while the maximum voltage threshold would be 16 V. The microprocessor would be able to identify the maximum voltage threshold for the vehicle's electrical powering system as the matching trigger during Step E, if a trend in the series of voltage readings is greater than or equal to the maximum voltage threshold. A single voltage reading from the multimeter module that is greater than or equal to the maximum voltage threshold is not enough for the microprocessor to identify the matching trigger. As a result, a consistent trend in the series of voltage readings needs to be greater than or equal to the maximum voltage in order for the microprocessor to identify the matching trigger, which prevents the microprocessor from identifying a random voltage spike in the series of voltage readings as the matching trigger. A high-voltage notification for the vehicle's electrical power system is outputted as the corresponding response to the matching trigger during Step F. The high-voltage notification indicates to the vehicle's owner that the vehicle's electrical powering system is running at an abnormally high voltage and that the vehicle's electrical power system could potentially be damaged from the abnormally high voltage. For example, the high-voltage notification can say "Regulator Issue or Wall Charging? Check charging system."

Figure 5:
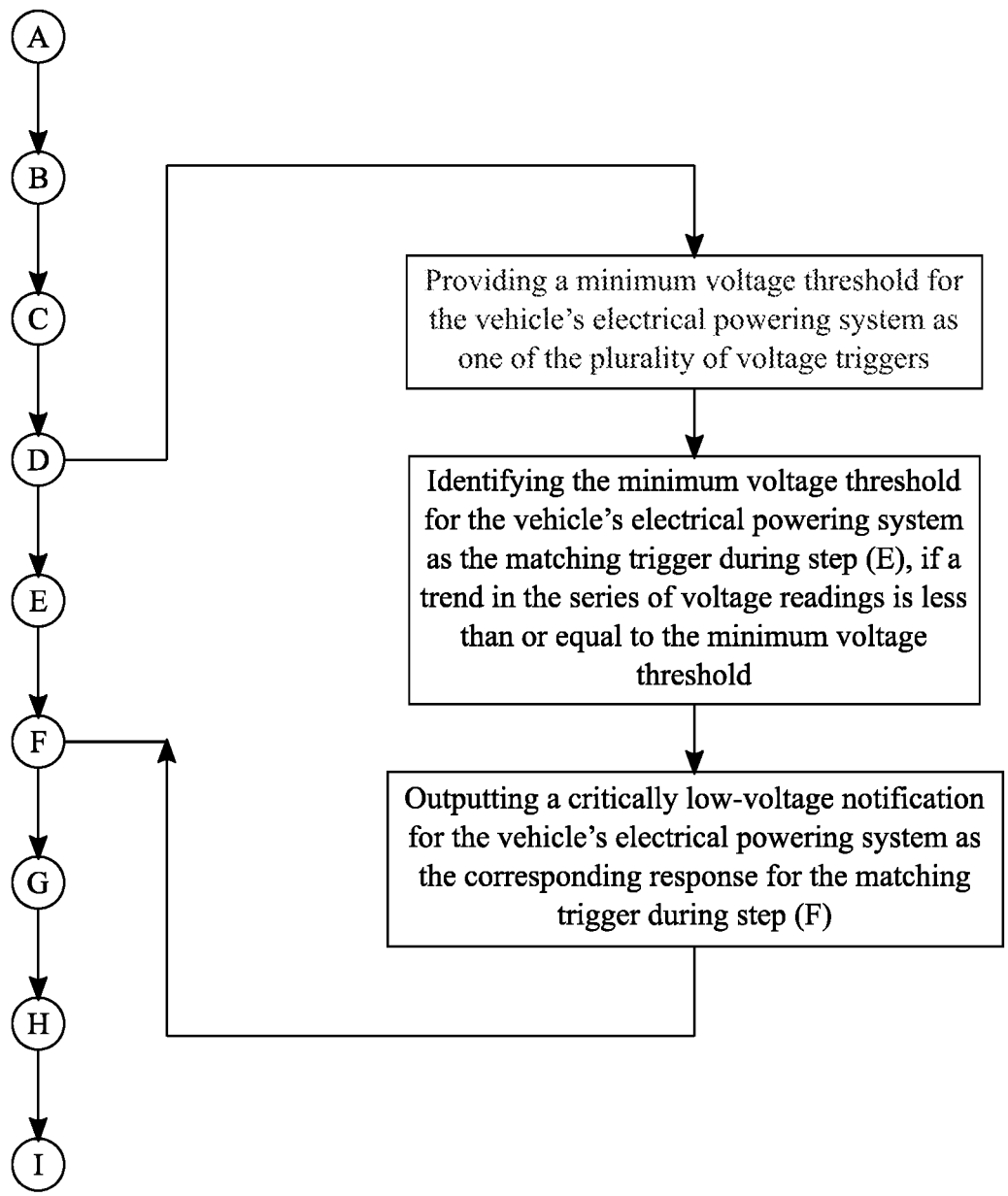
FIG. 5 is a flowchart illustrating the process of identifying and responding to a critically low-voltage situation for the vehicle's electrical powering system.

As can be seen in FIG. 5, a minimum voltage threshold for the vehicle's electric powering system can also be provided as one of the plurality of voltage triggers. The minimum voltage threshold is a voltage value that is abnormally lower than the regular operational voltage value of the vehicle's electric powering system. For example, the regular operational voltage value of the vehicle's battery would be 14 V, while the minimum voltage threshold would be 10.5 V. The microprocessor would be able to identify the minimum voltage threshold for the vehicle's electrical powering system as the matching trigger during Step E, if a trend in the series of voltage readings is less than or equal to the minimum voltage threshold. Similar to the maximum voltage threshold, a single voltage reading from the multimeter module that is less than or equal to the minimum voltage threshold is not enough for the microprocessor to identify the matching trigger. As a result, a consistent trend in the series of voltage readings needs to be less than or equal to the minimum voltage in order for the microprocessor to identify the matching trigger, which prevents the microprocessor from identifying a random voltage dip in the series of voltage readings as the matching trigger. A critically low-voltage notification for the vehicle's electrical power system is outputted as the corresponding response to the matching trigger during Step F. The critically low-voltage notification indicates to the vehicle's owner that the vehicle's electrical powering system is running at a critically low voltage and that the vehicle's electrical power system could potentially not have enough electrical power to start the vehicle's engine. For example, the critically low-voltage notification can say "Car may not start. Start car now!"

Figure 6:
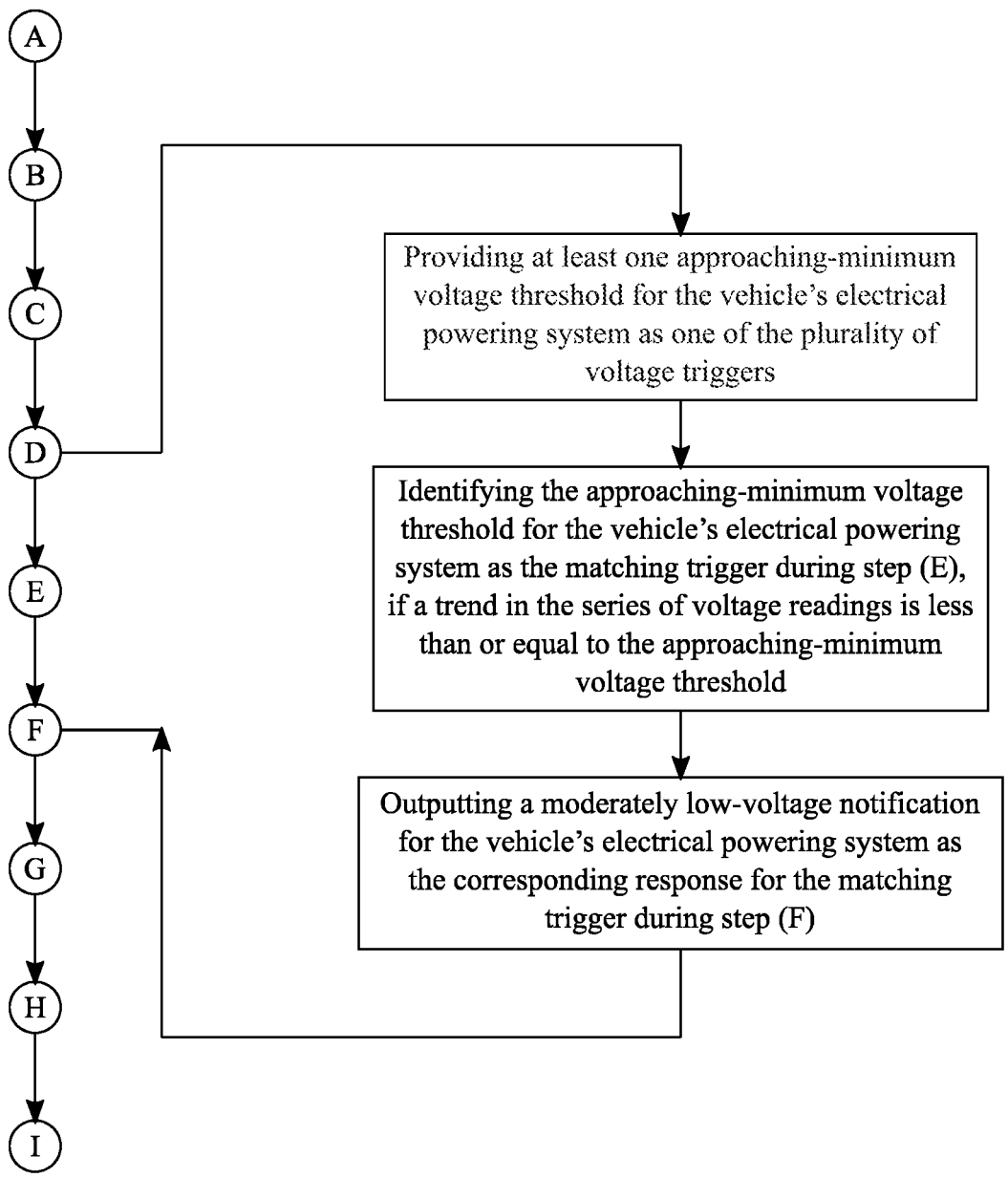
FIG. 6 is a flowchart illustrating the process of identifying and responding to a moderately low-voltage situation for the vehicle's electrical powering system.

The present invention is able to detect a low voltage situation for the vehicle's electrical powering system at tiered thresholds so that the vehicle's owner knows with what urgency they should start their vehicle's engine. Thus, at least one approaching-minimum voltage threshold for the vehicle's electric powering system can be provided as one of the plurality of voltage triggers, which is illustrated in FIG. 6. The approaching-minimum voltage threshold is a voltage value that is slightly lower than the regular operational voltage value of the vehicle's electric powering system. For example, the regular operational voltage value of the vehicle's battery would be 14 V, while a few of the approaching-minimum voltage thresholds could be 11.9 V, 11.6 V, and 11.3 V. The microprocessor would be able to identify the approaching-minimum voltage threshold for the vehicle's electrical powering system as the matching trigger during Step E, if a trend in the series of voltage readings is less than or equal to the approaching-minimum voltage threshold. Similar to the maximum voltage threshold and the minimum voltage threshold, a single voltage reading from the multimeter module that is less than or equal to the approaching-minimum voltage threshold is not enough for the microprocessor to identify the matching trigger. As a result, a consistent trend in the series of voltage readings needs to be less than or equal to the approaching-minimum voltage in order for the microprocessor to identify the matching trigger, which prevents the microprocessor from identifying a random voltage dip in the series of voltage readings as the matching trigger. A moderately low-voltage notification for the vehicle's electrical power system is outputted as the corresponding response to the matching trigger during Step F. Similar but less severe than the critically low-voltage notification, the moderately low-voltage notification indicates to the vehicle's owner that the vehicle's electrical powering system is running at a moderately low voltage and that the vehicle's electrical power system could potentially not have enough electrical power to start the vehicle's engine. For example, the moderately low-voltage notification can say "Battery charge is low. Start car soon."

Figure 7:
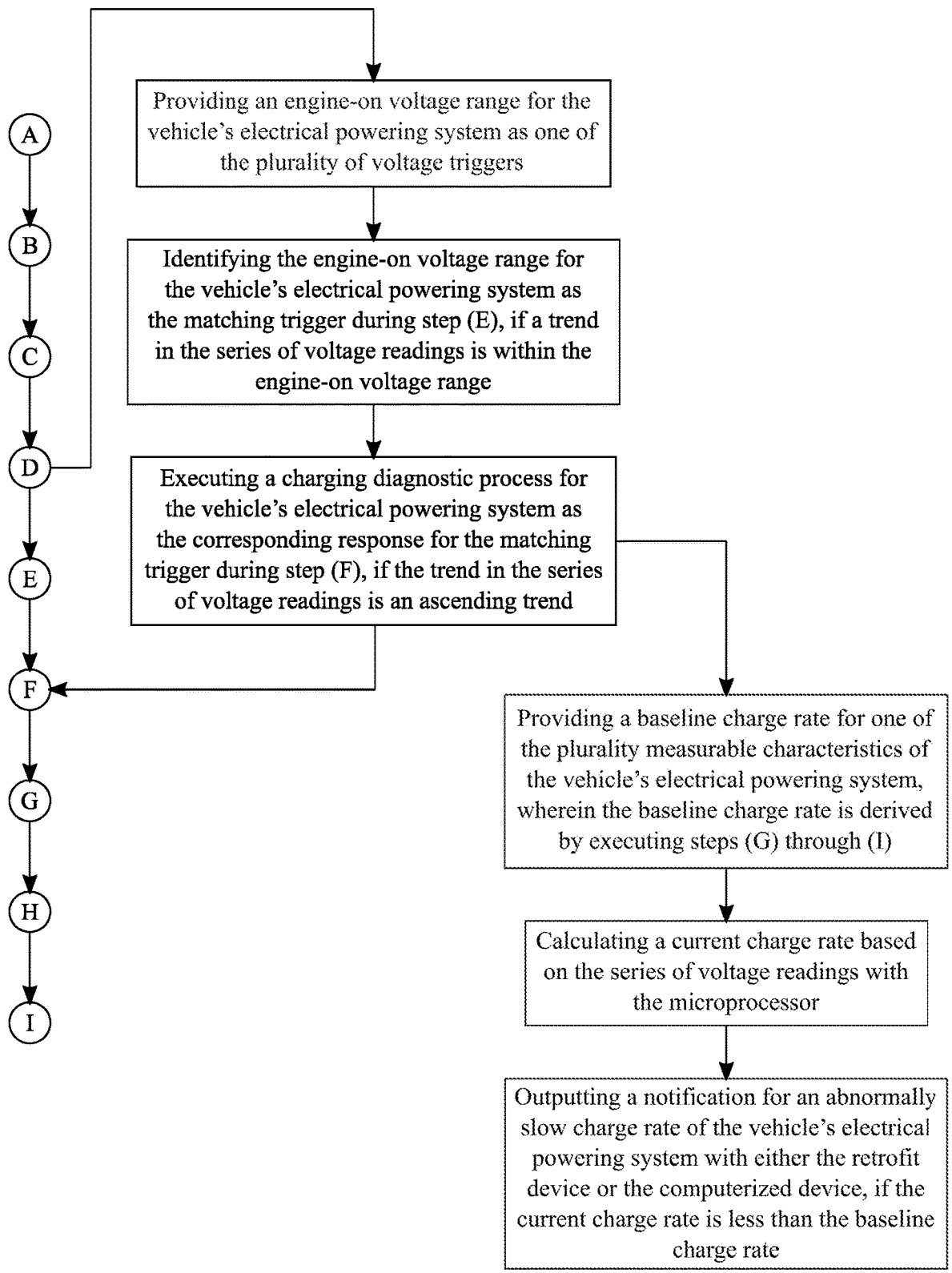
FIG. 7 is a flowchart illustrating the process of monitoring a charge rate for the vehicle's electrical powering system.

As can be seen in FIG. 7, an engine-on voltage range for the vehicle's electric powering system can also be provided as one of the plurality of voltage triggers. The engine-on voltage range is a voltage range that the vehicle's electric powering system normally operates at while the vehicle's engine is running. For example, a voltage reading of above 12.85 V would be within engine-on voltage range. The microprocessor would be able to identify the engine-on voltage range for the vehicle's electrical powering system as the matching trigger during Step E, if a trend in the series of voltage readings is within the engine-on voltage range. Similar to aforementioned voltage triggers, a single voltage reading from the multimeter module that is within the engine-on voltage range is not enough for the microprocessor to identify the matching trigger. As a result, an overwhelming number of readings from the series of voltage readings needs to be within the engine-on voltage range in order for the microprocessor to identify the matching trigger, which prevents the microprocessor from identifying a random voltage spike in the series of voltage readings as the matching trigger. Moreover, if the trend in the series of voltage readings is an ascending trend, then a charging diagnostic process for the vehicle's electrical powering system is executed as the corresponding response to the matching trigger during Step F. The charging diagnostic process verifies that the vehicle's alternator is properly recharging the vehicle's battery while the vehicle's engine is running.

More specifically, when the trend in the series of voltage readings is an ascending trend, a baseline charge rate needs to be provided as one of the plurality of measurable characteristics for the vehicle's electrical powering system. The baseline charge rate is a historical average of the charge rate for the vehicle's electrical powering system while the vehicle's engine is running and is derived by executing of Steps G through I. In order to perform the charging diagnostic process, the microprocessor needs to calculate a current charge rate based on the series of voltage readings. The current charge rate is the instantaneous charge rate that is derived from the most recent voltage readings taken by the multimeter module. The charging diagnostic process continues by outputting a notification for an abnormally slow charge rate of the vehicle's electrical powering system, if the current charge rate is less than the baseline charge rate. This notification alerts the vehicle's owner to the fact that the vehicle's alternator is charging the vehicle's battery at a slower rate than the same previously-monitored rate while the vehicle's engine is running. This notification also alerts the vehicle's owner to the fact that the vehicle's alternator may be malfunctioning or failing.

Figure 8:
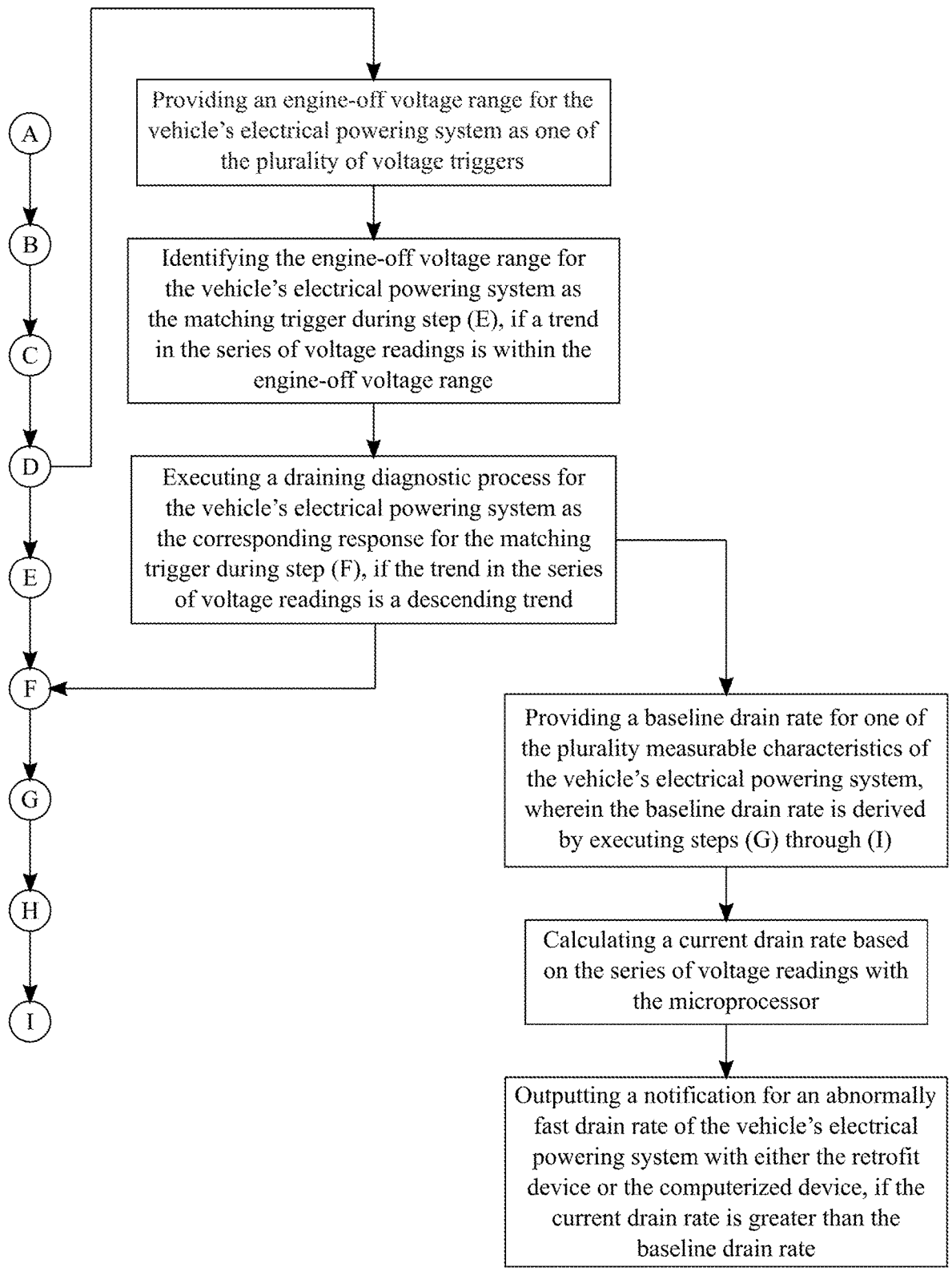
FIG. 8 is a flowchart illustrating the process of monitoring a drain rate for the vehicle's electrical powering system.

Likewise, an engine-off voltage range for the vehicle's electric powering system can also be provided as one of the plurality of voltage triggers, which is illustrated in the FIG. 8. The engine-off voltage range is a voltage range that the vehicle's electric powering system normally operates while at the vehicle's engine is not running. For example, a voltage reading of below 12.85 V would be within engine-off voltage range. The microprocessor would be able to identify the engine-off voltage range for the vehicle's electrical powering system as the matching trigger during Step E, if a trend in the series of voltage readings is within the engine-off voltage range. Similar to aforementioned voltage triggers, a single voltage reading from the multimeter module that is within the engine-off voltage range is not enough for the microprocessor to identify the matching trigger. As a result, an overwhelming number of readings from the series of voltage readings needs to be within the engine-off voltage range in order for the microprocessor to identify the matching trigger, which prevents the microprocessor from identifying a random voltage spike in the series of voltage readings as the matching trigger. In addition, if the trend in the series of voltage readings is a descending trend, then a draining diagnostic process for the vehicle's electrical powering system is executed as the corresponding response to the matching trigger during Step F. The draining diagnostic process verifies that the vehicle's battery is losing its electric potential energy at a normal rate while the vehicle's engine is not running.

More specifically, when the trend in the series of voltage readings is a descending trend, a baseline drain rate needs to be provided as one of the plurality of measurable characteristics for the vehicle's electrical powering system. The baseline drain rate is a historical average of the drain rate for the vehicle's electrical powering system while the vehicle's engine is not running and is derived by executing of Steps G through I. In order to perform the draining diagnostic process, the microprocessor needs to calculate a current drain rate based on the series of voltage readings. The current drain rate is the instantaneous drain rate that is derived from the most recent voltage readings taken by the multimeter module. The draining diagnostic process continues by outputting a notification for an abnormally fast charge rate of the vehicle's electrical powering system, if the current drain rate is greater than the baseline drain rate. The notification alerts the vehicle's owner to the fact that the vehicle's battery is losing its electrical potential energy at a faster rate than the same previously-monitored rate while the vehicle's engine is not running. This notification also alerts the vehicle's owner to the fact that the vehicle's battery may be malfunctioning or failing.

Figure 9:
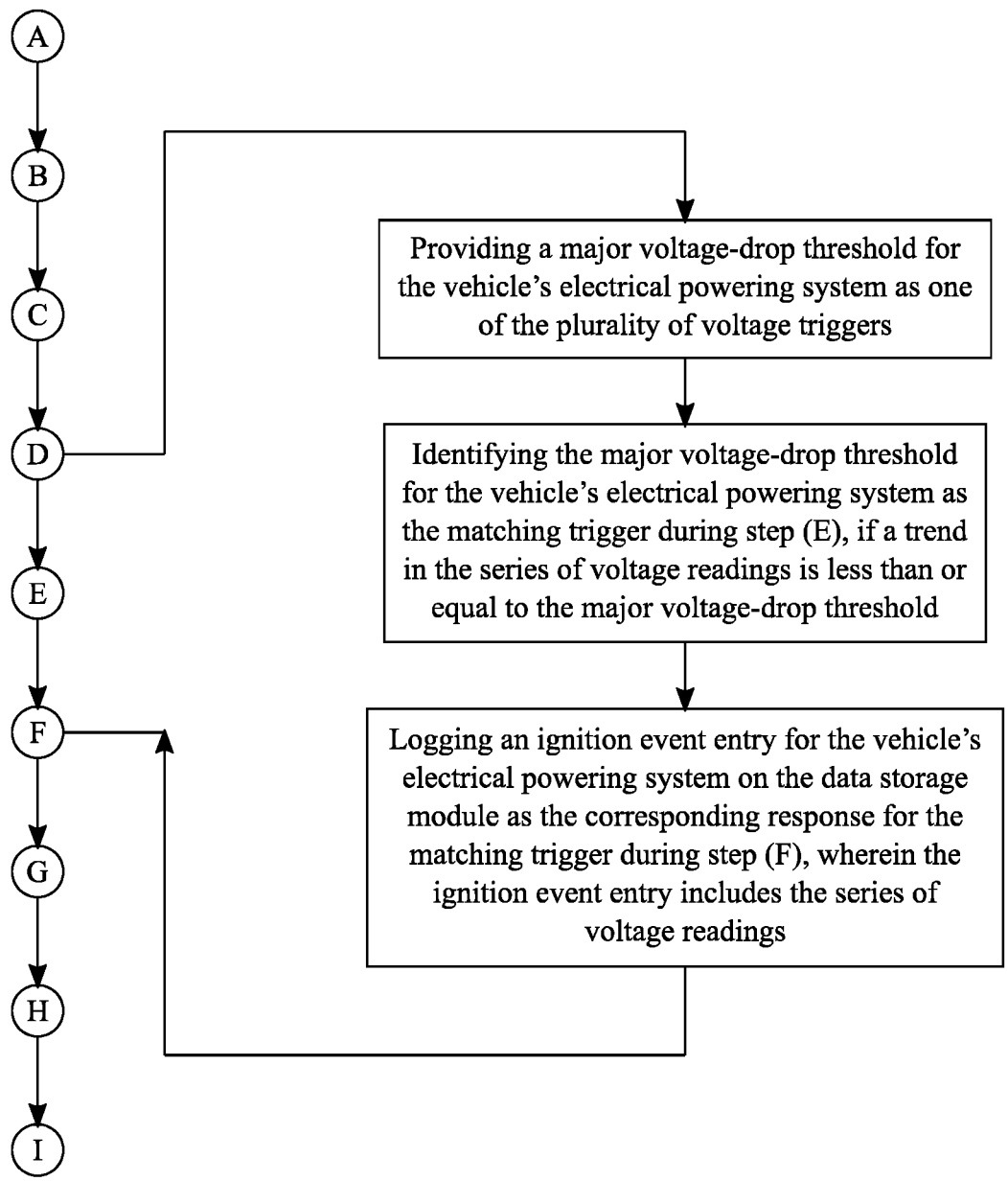
FIG. 9 is a flowchart illustrating the process of identifying and responding to a major voltage-change situation for the vehicle's electrical powering system.

The present invention is able to track and record regular operational events for the vehicle's electrical powering system. Thus, a major voltage-change threshold for the vehicle's electric powering system can be provided as one of the plurality of voltage triggers, which is shown in FIG. 9. The major voltage-change is an easily-recognizable voltage load that is temporarily placed on the vehicle's electrical power system. The microprocessor would be able to identify the major voltage-change threshold for the vehicle's electrical powering system as the matching trigger during Step E, if a trend in the series of voltage readings is less than or equal to the major voltage-change threshold. Similar to aforementioned voltage triggers, a single voltage reading from the multimeter module that is less than or equal to the major voltage-change threshold is not enough for the microprocessor to identify the matching trigger. As a result, a consistent trend in the series of voltage readings needs to be less than or equal to the major voltage-change threshold in order for the microprocessor to identify the matching trigger, which prevents the microprocessor from identifying a random voltage dip in the series of voltage readings as the matching trigger. An ignition event entry for the vehicle's electrical power system is logged on the data storage module as the corresponding response to the matching trigger during Step F. The ignition event entry recognizes the ignition of the vehicle's engine and records the series of voltage readings as a part of the ignition event entry. Consequently, the present invention is able to monitor how the voltage readings within the ignition event entry change over time and through multiple iterations of the overall process.

Figure 10:
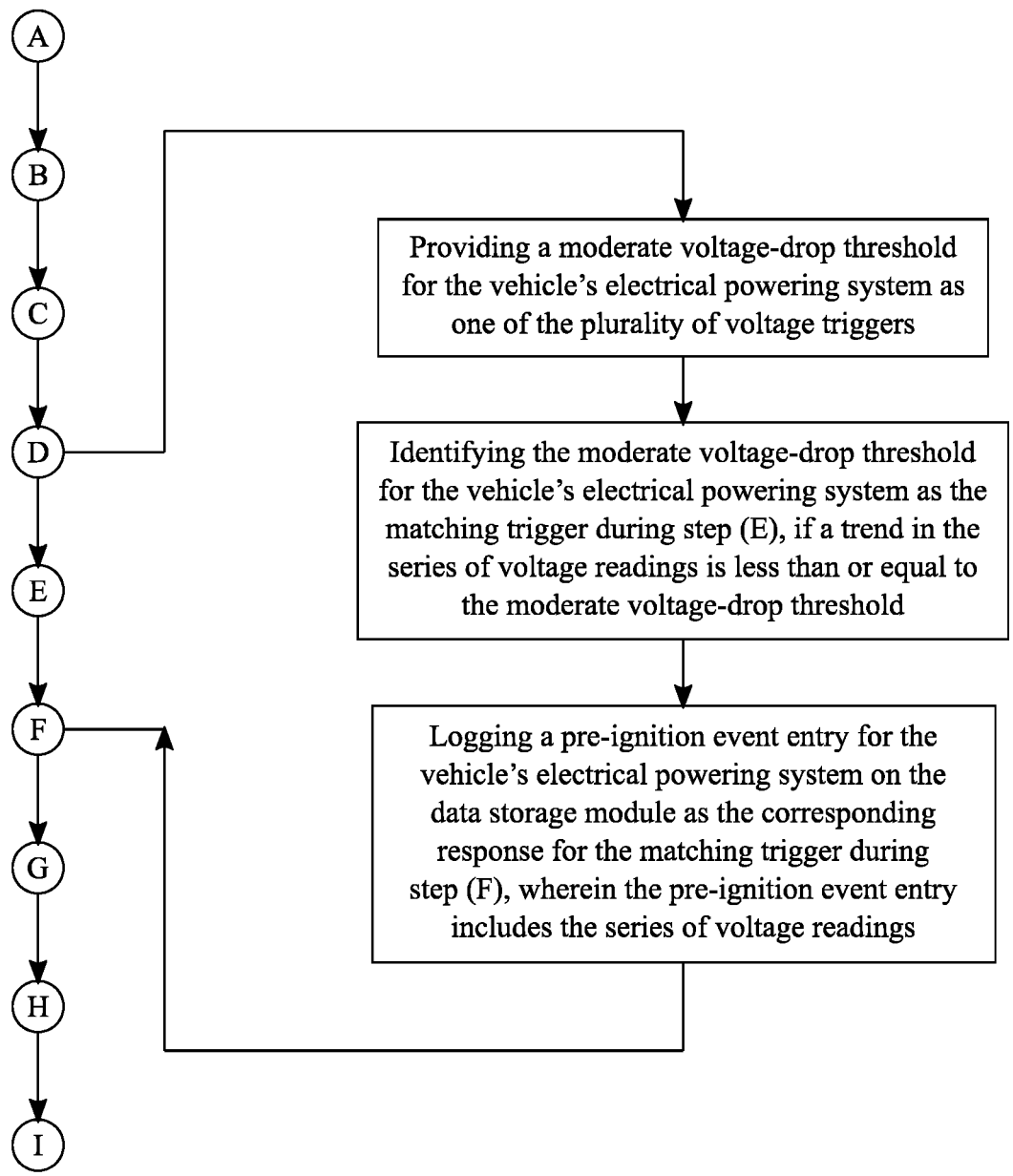
FIG. 10 is a flowchart illustrating the process of identifying and responding to a moderate voltage-change situation for the vehicle's electrical powering system.

In addition, a moderate voltage-change threshold for the vehicle's electric powering system can be provided as one of the plurality of voltage triggers, which is shown in FIG. 10. The moderate voltage-change is an easily-recognizable voltage load that is temporarily placed on the vehicle's electrical power system. The microprocessor would be able to identify the moderate voltage-change threshold for the vehicle's electrical powering system as the matching trigger during Step E, if a trend in the series of voltage readings is less than or equal to the moderate voltage-change threshold. Similar to aforementioned voltage triggers, a single voltage reading from the multimeter module that is less than or equal to the moderate voltage-change threshold is not enough for the microprocessor to identify the matching trigger. As a result, a consistent trend in the series of voltage readings needs to be less than or equal to the moderate voltage-change threshold in order for the microprocessor to identify the matching trigger, which prevents the microprocessor from identifying a random voltage dip in the series of voltage readings as the matching trigger. A pre-ignition event entry for the vehicle's electrical power system is logged on the data storage module as the corresponding response to the matching trigger during Step F. The pre-ignition event entry recognizes that the vehicle's engine is ready to begin ignition and records the series of voltage readings as a part of the pre-ignition event entry. Consequently, the present invention is able to monitor how the voltage readings within the pre-ignition event entry change over time and through multiple iterations of the overall process.

Figure 11:
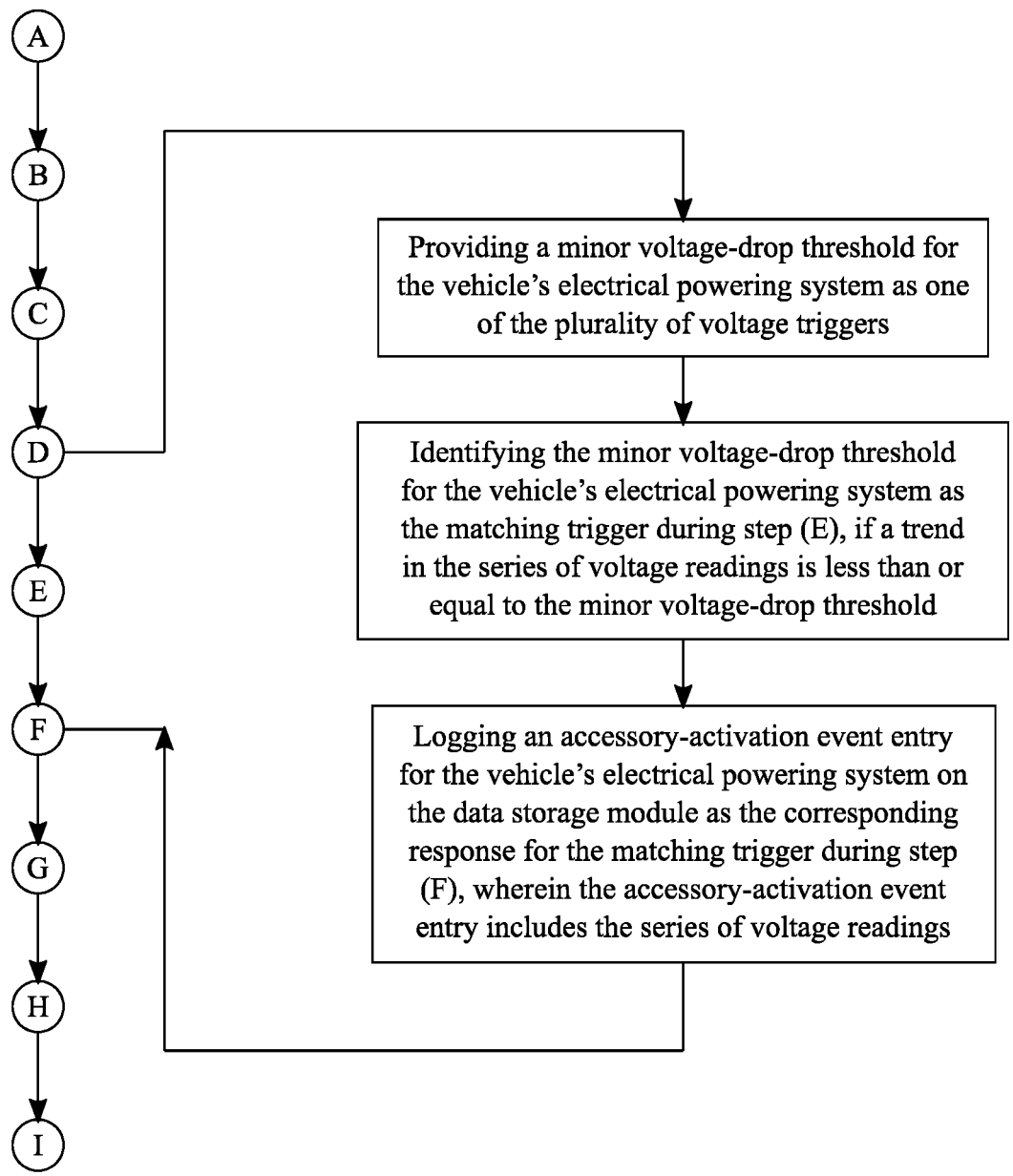
FIG. 11 is a flowchart illustrating the process of identifying and responding to a minor voltage-change situation for the vehicle's electrical powering system.

Furthermore, a minor voltage-change threshold for the vehicle's electric powering system can be provided as one of the plurality of voltage triggers, which is shown in FIG. 11. The minor voltage-change is an easily-recognizable voltage load that is temporarily placed on the vehicle's electrical power system. The microprocessor would be able to identify the minor voltage-change threshold for the vehicle's electrical powering system as the matching trigger during Step E, if a trend in the series of voltage readings is less than or equal to the minor voltage-change threshold. Similar to aforementioned voltage triggers, a single voltage reading from the multimeter module that is less than or equal to the minor voltage-change threshold is not enough for the microprocessor to identify the matching trigger. As a result, a consistent trend in the series of voltage readings needs to be less than or equal to the minor voltage-change threshold in order for the microprocessor to identify the matching trigger, which prevents the microprocessor from identifying a random voltage dip in the series of voltage readings as the matching trigger. An accessory-activation event entry for the vehicle's electrical power system is logged on the data storage module as the corresponding response to the matching trigger during Step F. The accessory-activation event entry recognizes that some electrical accessory such as a vehicle's alarm system or a vehicle's interior light is active and is drawing power from the vehicle's battery. The accessory-activation event records the series of voltage readings as a part of the accessory-activation event entry. Consequently, the present invention is able to monitor how the voltage readings within the accessory-activation event entry change over time and through multiple iterations of the overall process.

Figure 12:
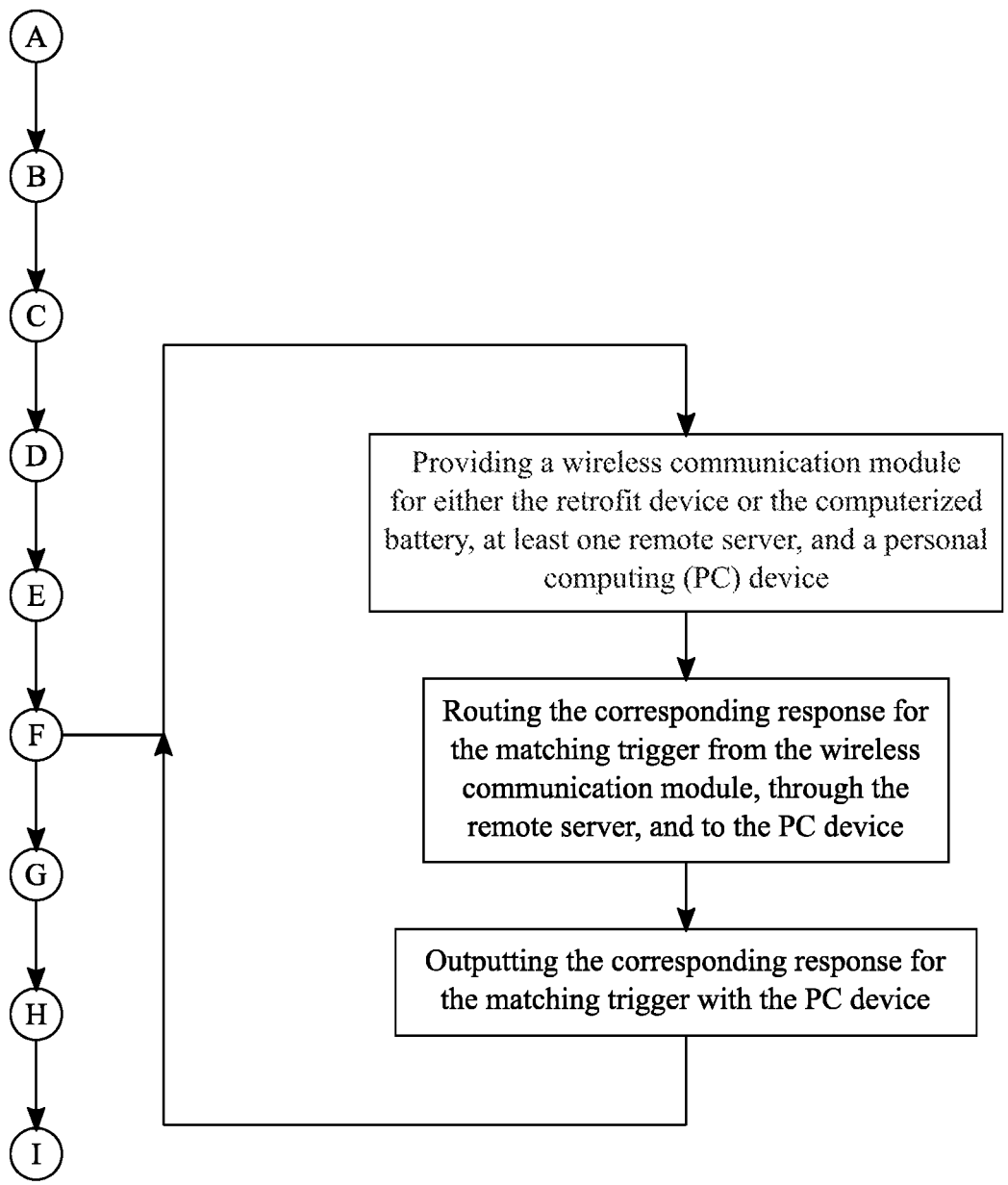
FIG. 12 is a flowchart illustrating the process of outputting a response through at least one remote server and a personal computing (PC) device.

The present invention can output the corresponding response to the vehicle's owner in a number of different methods, each of which has their own situational advantages. As can be seen in FIG. 12, one method to output the corresponding response to the vehicle's owner is to implement a wireless communication module for either the retrofit device or the computerized battery, at least one remote server, and a personal computing (PC) device. The wireless communication module allows either the retrofit device or the computerized battery to wirelessly communicate with a computing device at a remote location. The wireless communication module preferably uses long-range radio frequency (RF) transmissions (e.g. WiFi and/or cellular network). Thus, the corresponding response for the matching trigger is routed from the wireless communication module, through the remote server, and to the PC device. The remote server is a hub that manages the exchange of data between either the retrofit device or the computerized battery and the PC device. The remote server can also be used to host a website that provides the vehicle's owner with another interface to view and navigate the sensing data gathered by the present invention on the vehicle's electrical powering system. However, the PC device is primarily used to output the corresponding response for the matching trigger in this method. Consequently, the PC device is able to interact and notify the vehicle's owner of any noteworthy information determined by either the retrofit device or the computerized battery. The PC device can be, but is not limited to, a desktop, a laptop, a tablet PC, or a smart-phone. This method is typically implemented when the vehicle's owner and their PC device are not located near the vehicle and either the retrofit device or the computerized battery. For example, this method is implemented while the vehicle is parked in the garage and while the vehicle's owner and their PC device are inside of the house.

Figure 13:
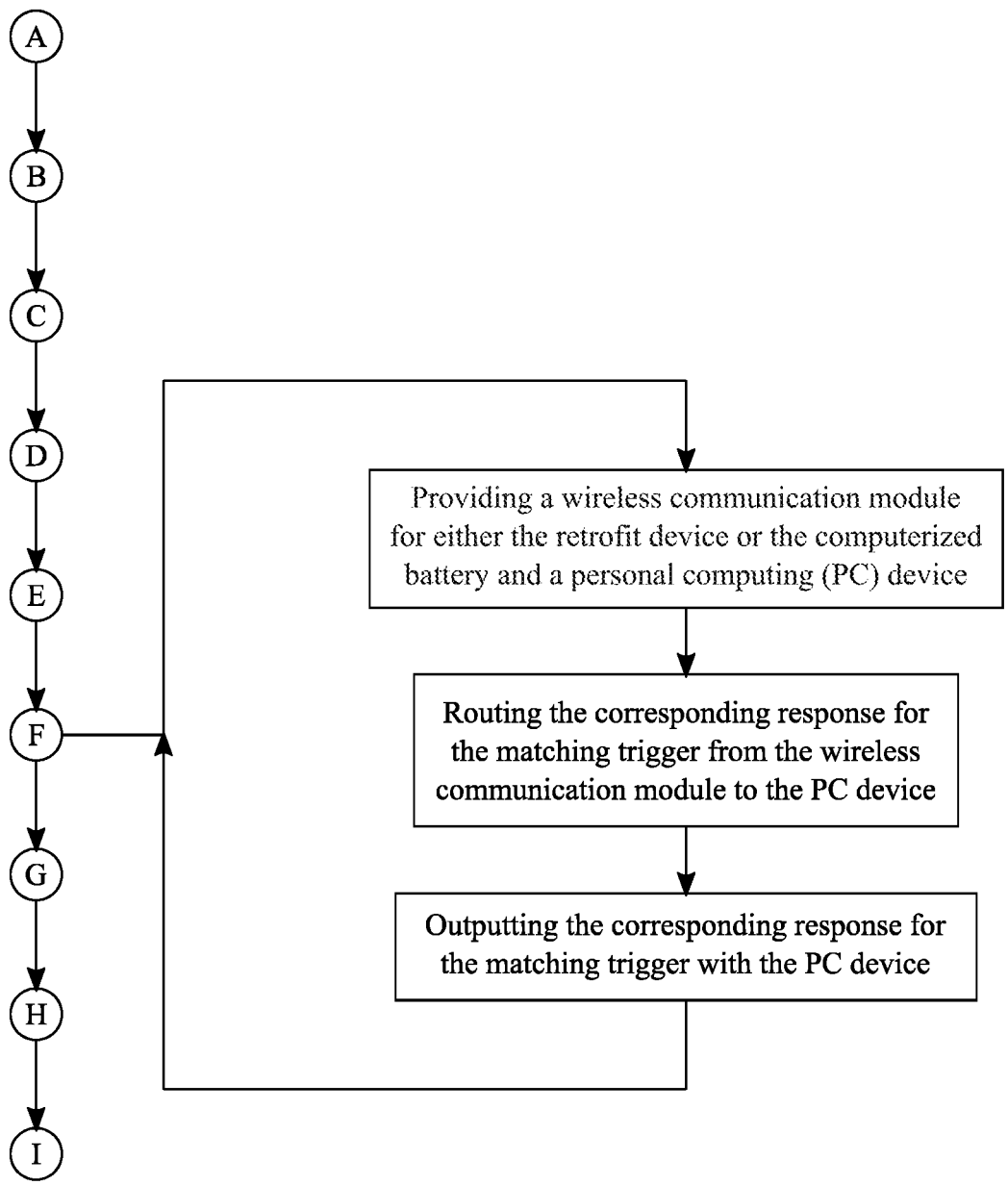
FIG. 13 is a flowchart illustrating the process of outputting a response with a PC device.

In reference to FIG. 13, another method to output the corresponding response to the vehicle's owner is to only implement the wireless communication module for either the retrofit device or the computerized battery and the PC device. In this method, the corresponding response is directly routed from the wireless communication module to the PC device. Also in this method, the wireless communication module preferably uses short-range RF transmissions (e.g. Bluetooth). Similar to the previous method, the PC device is used to output the corresponding response for the matching trigger and is able to remotely interact and notify the vehicle's owner of any noteworthy information determined by either the retrofit device or the computerized battery. This method is typically implemented while the vehicle's owner and their PC device are located near the vehicle and either the retrofit device or the computerized battery. For example, this method is implemented while the vehicle's owner and their PC device are within the vehicle or just outside the vehicle.

Figure 14:
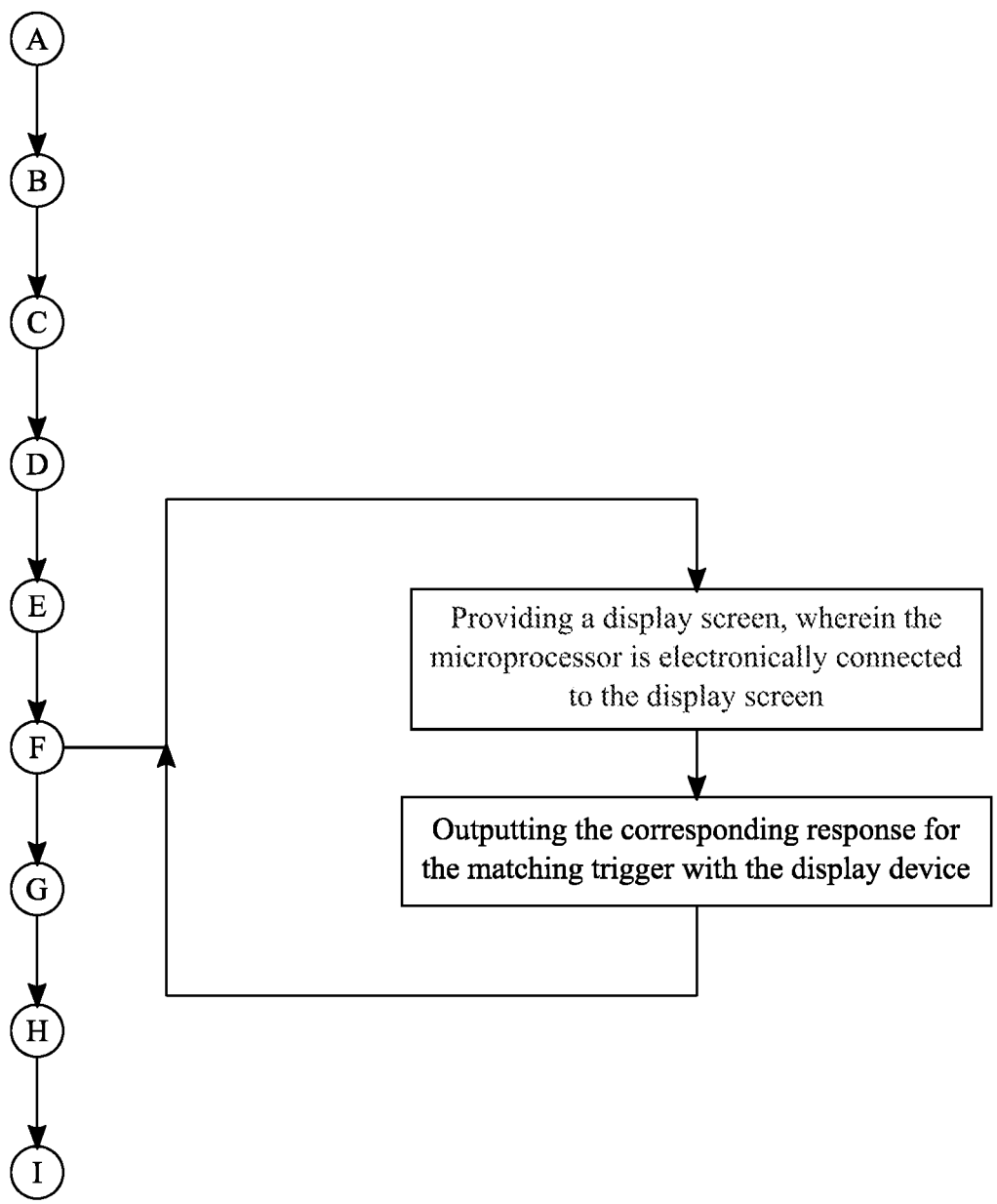
FIG. 14 is a flowchart illustrating the process of outputting a response with a display device.

As can be seen in FIG. 14, another method to output the corresponding response to the vehicle's owner is to implement a display device that is electronically connected to the microprocessor of either the retrofit device or the computerized battery. The display device is preferably some kind of flat screen that is electronically integrated into either the retrofit device or the computerized battery, such as a liquid crystal display (LCD). The display device is used to output the corresponding respond for the matching trigger is able to directly interact and notify the vehicle's owner of any noteworthy information determined by either the retrofit device or the computerized battery. This method is typically implemented when the vehicle's owner in located within visual range of either the retrofit device or the computerized battery. For example, this method is implemented while the vehicle's owner is inside of the vehicle and the retrofit device is plugged into the vehicle's cigarette lighter socket. In some embodiments of the present invention, the display device can be a touchscreen that is used to enter the secure set identifier (SSID) code in order gain access to a communication network (e.g. WiFi).

Figure 15:
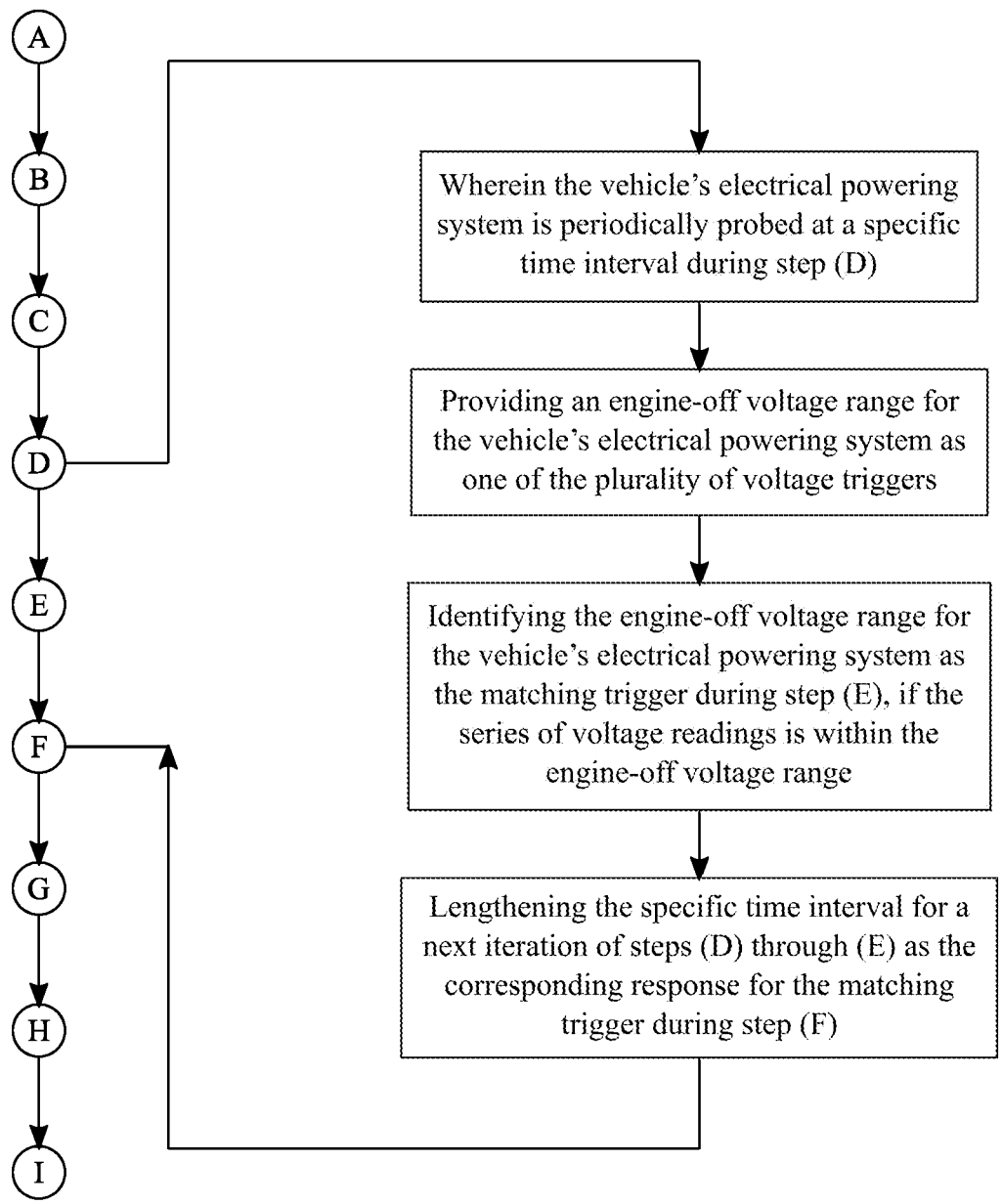
FIG. 15 is a flowchart illustrating the process of activating a sleep mode for either the retrofit device or the computerized battery.

Either the retrofit device or the computerized battery functions by drawing power from the vehicle's electrical powering system. Thus, either the retrofit device or the computerized battery reduces their monitoring activities while the vehicle's engine is not running. In order to reduce its monitoring activities, the vehicle's electrical powering system needs to periodically probe at a specific time interval during Step D, which is shown in FIG. 15. The specific time interval is a constant time period in between two consecutive voltage readings that are taken by the multimeter module. Again, the engine-off voltage range for the vehicle's electrical powering system is provided as one of the plurality of voltage triggers. The microprocessor would be able to identify the engine-off voltage range for the vehicle's electrical powering system as the matching trigger during Step E, if a trend in the series of voltage readings is within the engine-off voltage range. In order to put either the retrofit device or the computerized battery into a kind of sleep mode while the vehicle's engine is not running, the specific time interval is lengthened for the next iteration of the Steps D through E as the corresponding response for the matching trigger during step F. The sleep mode for either the retrofit device or the computerized battery prevents the present invention from adversely draining the vehicle's electrical powering system while monitoring the functional status of the vehicle's electrical powering system. Thus, the multimeter module periodically probes the vehicle's electrical powering system at longer and longer time intervals, until the vehicle's engine is turned back on and either the retrofit device or the computerized battery returns its monitoring activities to their normal level.

Figure 16:
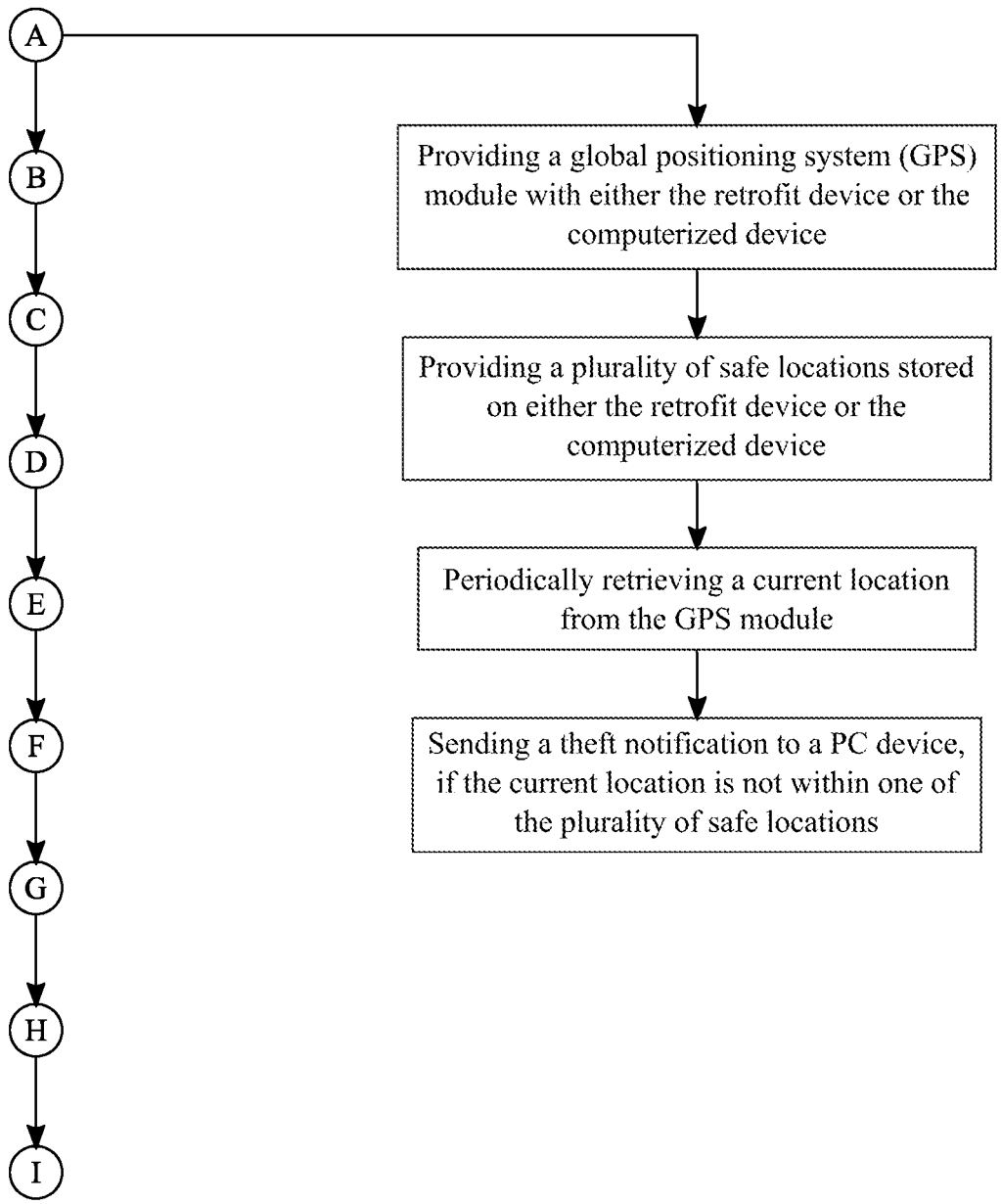
FIG. 16 is a flowchart illustrating the process of using a global positioning system (GPS) module as an anti-theft measure.

Either the retrofit device or the computerized battery can also be used as an anti-theft device for the vehicle. As can be seen in FIG. 16, a global positioning system (GPS) module is provided with either the retrofit device or the computerized battery and is used to identify the geospatial location of either the retrofit device or the computerized battery. A plurality of safe locations is stored on either the retrofit device or the computerized battery and is used to indicate where the vehicle's owner expects their vehicle to be (e.g. parked in their garage, on their regular route to work, parked at their work office, etc.). The GPS module periodically retrieves a current location of either the retrofit device or the computerized battery, and if the current location of either the retrofit device or the computerized battery is not within one of the plurality of safe locations, then a theft notification is sent to a PC device that is associated with the vehicle's owner. Because a vehicle does not drive to the same locations everyday, the vehicle's owner would be able to easily dismiss the theft notification in case the vehicle's owner decided to drive to a new location.

In some embodiments of the present invention, either the retrofit device or the computerized battery is electrically coupled to the vehicle's electrical powering system through a disconnection device, which can be used to readily disconnect the vehicle's electrical powering system from either the retrofit device or the computerized battery and/or the rest of the vehicle. The disconnection device is used to prevent damage to either the retrofit device or the computerized battery or/and the rest of the vehicle in case the vehicle's electrical powering system is malfunctioning or failing. Thus, actuating the disconnection device can be tied into the corresponding response for any one of the plurality of voltage triggers.

As an alternative disclosure of the present invention, the present invention may consist of a small adapter and implements a mobile software application executed on a portable computing device. The adapter plugs into the portable computing device, such as a smart-phone or tablet PC. The adapter has a microprocessor that allows the battery charge to be determined by the mobile software application on the portable device, which includes, but is not limited to, voltage, current, and resistance/impedance (i.e. if used to detect a complete circuit). The adapter could be plugged into a universal serial bus (USB) port that, when the user sticks into a wall plug, allows the present invention to detect the alternating current (AC) and display the voltage value around the 110 V range. If the adapter is put into a direct current (DC) adapter like a car charger, then the present invention would detect a value within the 10 to 14 V range.

The adapter could also extend into a negative and positive wire set so that the present invention can be used on other items like household batteries and detecting resistance. The mobile software application is written to read and display the information.

Although the invention has been explained in relation to its preferred embodiment, it is to be understood that many other possible modifications and variations can be made without departing from the spirit and scope of the invention as hereinafter claimed.

What is claimed is:

1. A method of monitoring a functional status of a vehicle's electrical powering system, the method comprises the steps of:
   (A) providing a multimeter module, a microprocessor, and a data storage module, wherein the multimeter module, the microprocessor, and the data storage module are comprised by either a retrofit device or a computerized battery, and wherein the retrofit device is electrically spliced into the vehicle's electrical powering system, and wherein the computerized battery is comprised by the vehicle's electrical powering system;
   (B) providing a plurality of measurable characteristics of the vehicle's electrical powering system, wherein each measurable characteristic is associated to a manufacturer specification stored on the data storage module;
   (C) providing a plurality of voltage triggers stored on the data storage module, wherein each voltage trigger is associated to a corresponding response;
   (D) periodically probing the vehicle's electrical powering system for a series of voltage readings with the multimeter module and storing the series of voltage readings on the data storage module;
   (E) comparing the series of voltage readings to each voltage trigger with the microprocessor in order to identify at least one matching trigger from the plurality of voltage triggers;
   (F) executing the corresponding response for the matching trigger with the microprocessor, if the matching trigger is identified during step (E);
   (G) deriving a baseline for each measurable characteristic through statistical summarization and setting the baseline for each measurable characteristic to the manufacturer specification with the microprocessor;
   (H) executing a plurality of iterations for step (D) in order to compile a time-dependent dataset of voltage readings, wherein the time-dependent dataset of voltage readings includes the series of voltage readings from each iteration;
   (I) updating the baseline for each measurable characteristic according to the time-dependent dataset of voltage readings;
   providing a minor voltage-change threshold for the vehicle's electrical powering system as one of the plurality of voltage triggers;
   identifying the minor voltage-change threshold for the vehicle's electrical powering system as the matching trigger during step (E), if a trend in the series of voltage readings is less than or equal to the minor voltage-change threshold; and
   logging an accessory-activation event entry for the vehicle's electrical powering system on the data storage module as the corresponding response for the matching trigger during step (F), wherein the accessory-activation event entry includes the series of voltage readings.

2. The method of monitoring a functional status of a vehicle's electrical powering system, the method as claimed in claim 1 comprises the steps of:
   providing a maximum voltage threshold for the vehicle's electrical powering system as one of the plurality of voltage triggers;
   identifying the maximum voltage threshold for the vehicle's electrical powering system as the matching trigger during step (E), if a trend in the series of voltage readings is greater than or equal to the maximum voltage threshold; and
   outputting a high-voltage notification for the vehicle's electrical powering system as the corresponding response for the matching trigger during step (F).

3. The method of monitoring a functional status of a vehicle's electrical powering system, the method as claimed in claim 1 comprises the steps of:
   providing a minimum voltage threshold for the vehicle's electrical powering system as one of the plurality of voltage triggers;
   identifying the minimum voltage threshold for the vehicle's electrical powering system as the matching trigger during step (E), if a trend in the series of voltage readings is less than or equal to the minimum voltage threshold; and
   outputting a critically low-voltage notification for the vehicle's electrical powering system as the corresponding response for the matching trigger during step (F).

4. The method of monitoring a functional status of a vehicle's electrical powering system, the method as claimed in claim 1 comprises the steps of:
   providing at least one approaching-minimum voltage threshold for the vehicle's electrical powering system as one of the plurality of voltage triggers;
   identifying the approaching-minimum voltage threshold for the vehicle's electrical powering system as the matching trigger during step (E), if a trend in the series of voltage readings is less than or equal to the approaching-minimum voltage threshold; and
   outputting a moderately low-voltage notification for the vehicle's electrical powering system as the corresponding response for the matching trigger during step (F).

5. The method of monitoring a functional status of a vehicle's electrical powering system, the method as claimed in claim 1 comprises the steps of:
   providing an engine-on voltage range for the vehicle's electrical powering system as one of the plurality of voltage triggers;
   identifying the engine-on voltage range for the vehicle's electrical powering system as the matching trigger during step (E), if a trend in the series of voltage readings is within the engine-on voltage range; and
   executing a charging diagnostic process for the vehicle's electrical powering system as the corresponding response for the matching trigger during step (F), if the trend in the series of voltage readings is an ascending trend.

6. The method of monitoring a functional status of a vehicle's electrical powering system, the method as claimed in claim 5 comprises the steps of:
   wherein the trend in the series of voltage readings is an ascending trend;
   providing a baseline charge rate for one of the plurality measurable characteristics of the vehicle's electrical powering system, wherein the baseline charge rate is derived by executing steps (G) through (I);

calculating a current charge rate based on the series of voltage readings with the microprocessor; and outputting a notification for an abnormally slow charge rate of the vehicle's electrical powering system with either the retrofit device or the computerized battery, if the current charge rate is less than the baseline charge rate.

7. The method of monitoring a functional status of a vehicle's electrical powering system, the method as claimed in claim 1 comprises the steps of:

providing an engine-off voltage range for the vehicle's electrical powering system as one of the plurality of voltage triggers;

identifying the engine-off voltage range for the vehicle's electrical powering system as the matching trigger during step (E), if a trend in the series of voltage readings is within the engine-off voltage range; and executing a draining diagnostic process for the vehicle's electrical powering system as the corresponding response for the matching trigger during step (F), if the trend in the series of voltage readings is a descending trend.

8. The method of monitoring a functional status of a vehicle's electrical powering system, the method as claimed in claim 7 comprises the steps of:

wherein the trend in the series of voltage readings is a descending trend;

providing a baseline drain rate for one of the plurality measurable characteristics of the vehicle's electrical powering system, wherein the baseline drain rate is derived by executing steps (G) through (I);

calculating a current drain rate based on the series of voltage readings with the microprocessor; and outputting a notification for an abnormally fast drain rate of the vehicle's electrical powering system with either the retrofit device or the computerized battery, if the current drain rate is greater than the baseline drain rate.

9. The method of monitoring a functional status of a vehicle's electrical powering system, the method as claimed in claim 1 comprises the steps of:

providing a major voltage-change threshold for the vehicle's electrical powering system as one of the plurality of voltage triggers;

identifying the major voltage-change threshold for the vehicle's electrical powering system as the matching trigger during step (E), if a trend in the series of voltage readings is less than or equal to the major voltage-change threshold; and logging an ignition event entry for the vehicle's electrical powering system on the data storage module as the corresponding response for the matching trigger during step (F), wherein the ignition event entry includes the series of voltage readings.

10. The method of monitoring a functional status of a vehicle's electrical powering system, the method as claimed in claim 1 comprises the steps of:

providing a moderate voltage-change threshold for the vehicle's electrical powering system as one of the plurality of voltage triggers;

identifying the moderate voltage-change threshold for the vehicle's electrical powering system as the matching trigger during step (E), if a trend in the series of voltage readings is less than or equal to the moderate voltage-change threshold; and logging a pre-ignition event entry for the vehicle's electrical powering system on the data storage module as the corresponding response for the matching trigger during step (F), wherein the pre-ignition event entry includes the series of voltage readings.

11. The method of monitoring a functional status of a vehicle's electrical powering system, the method as claimed in claim 1 comprises the steps of:

providing a wireless communication module for either the retrofit device or the computerized battery, at least one remote server, and a personal computing (PC) device;

routing the corresponding response for the matching trigger from the wireless communication module, through the remote server, and to the PC device; and outputting the corresponding response for the matching trigger with the PC device.

12. The method of monitoring a functional status of a vehicle's electrical powering system, the method as claimed in claim 1 comprises the steps of:

providing a wireless communication module for either the retrofit device or the computerized battery and a personal computing (PC) device;

routing the corresponding response for the matching trigger from the wireless communication module to the PC device; and outputting the corresponding response for the matching trigger with the PC device.

13. The method of monitoring a functional status of a vehicle's electrical powering system, the method as claimed in claim 1 comprises the steps of:

providing a display screen, wherein the microprocessor is electronically connected to the display screen; and outputting the corresponding response for the matching trigger with the display screen.

14. The method of monitoring a functional status of a vehicle's electrical powering system, the method as claimed in claim 1 comprises the steps of:

wherein the vehicle's electrical powering system is periodically probed at a specific time interval during step (D);

providing an engine-off voltage range for the vehicle's electrical powering system as one of the plurality of voltage triggers;

identifying the engine-off voltage range for the vehicle's electrical powering system as the matching trigger during step (E), if the series of voltage readings is within the engine-off voltage range; and lengthening the specific time interval for a next iteration of steps (D) through (E) as the corresponding response for the matching trigger during step (F).

15. The method of monitoring a functional status of a vehicle's electrical powering system, the method as claimed in claim 1 comprises the steps of:

providing a global positioning system (GPS) module with either the retrofit device or the computerized battery;

providing a plurality of safe locations stored on either the retrofit device or the computerized battery;

periodically retrieving a current location from the GPS module; and sending a theft notification to a PC device, if the current location is not within one of the plurality of safe locations.

16. The method of monitoring a functional status of a vehicle's electrical powering system, the method as claimed in claim 1, wherein the data storage module is a secure digital (SD) card.

* * * * *